(12) United States Patent
Athavale

(10) Patent No.: US 12,666,043 B2
(45) Date of Patent: Jun. 23, 2026

(54) VIDEO QUALITY ESTIMATION WITH A MACHINE LEARNING MODEL AS AN OPERATING SYSTEM SERVICE OR CLOUD SERVICE

(71) Applicant: Microsoft Technology Licensing, LLC, Redmond, WA (US)

(72) Inventor: Rohit Bhalchandra Athavale, Rancho Cucamonga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/601,915

(22) Filed: Mar. 11, 2024

(65) Prior Publication Data

US 2025/0287015 A1 Sep. 11, 2025

(51) Int. Cl.
*H04N 19/154* (2014.01)
*G06T 7/00* (2017.01)
(Continued)

(52) U.S. Cl.
CPC ......... *H04N 19/154* (2014.11); *G06T 7/0002* (2013.01); *H04N 19/164* (2014.11);
(Continued)

(58) Field of Classification Search
CPC .. H04N 19/154; H04N 19/164; H04N 19/172; H04N 19/42; G06T 7/0002;
(Continued)

(56) References Cited

U.S. PATENT DOCUMENTS

| | | | |
|---|---|---|---|
| 2003/0037237 A1* | 2/2003 | Abgrall | H04L 63/062 |
| | | | 713/166 |
| 2010/0043044 A1 | 2/2010 | Li et al. | |

(Continued)

FOREIGN PATENT DOCUMENTS

WO WO 2024/073515 4/2024

OTHER PUBLICATIONS

Communication pursuant to Rule 69 EPC—reminder concerning payment of the designation fee (Art. 79(2) EPC) and of the examination fee (Art. 94(1) EPC)—and invitation pursuant to Rule 70a(1) EPC dated Sep. 22, 2025, from European Patent Application No. 25161697.5, 2 pp.

(Continued)

*Primary Examiner* — Tracy Y. Li
(74) *Attorney, Agent, or Firm* — Klarquist Sparkman, LLP

(57) ABSTRACT

With video quality estimation provided as an operating system service or cloud service, estimates of video quality can be collected unobtrusively and without feedback from video playback applications or viewers. For example, for a portion of reconstructed video content, an operating system service of a client computer system receives video data, estimates video quality of the portion of reconstructed video content using the video data, and sends results of the video quality estimation to an application executing on the client computer system. Or, as another example, for a portion of reconstructed video content, a cloud service of a server computer system receives video data, estimates video quality of the portion of reconstructed video content using the video data, generates encoder control values based at least in part on analysis of results of the video quality estimation, and sends the encoder control values to a streaming or conferencing service.

20 Claims, 9 Drawing Sheets

(51) Int. Cl.
  *H04N 19/164* (2014.01)
  *H04N 19/172* (2014.01)
  *H04N 19/42* (2014.01)

(52) U.S. Cl.
  CPC ........... *H04N 19/172* (2014.11); *H04N 19/42* (2014.11); *G06T 2207/10016* (2013.01); *G06T 2207/20084* (2013.01); *G06T 2207/30168* (2013.01)

(58) Field of Classification Search
  CPC . G06T 2207/10016; G06T 2207/20084; G06T 2207/30168
  See application file for complete search history.

(56) References Cited

U.S. PATENT DOCUMENTS

| | | | |
|---|---|---|---|
| 2014/0269936 A1* | 9/2014 | Shivadas | H04N 19/177 375/240.26 |
| 2014/0376616 A1* | 12/2014 | Li | H04N 19/154 375/240.03 |
| 2017/0251200 A1* | 8/2017 | Reitel | H04L 65/1089 |
| 2021/0358178 A1 | 11/2021 | Staudigl et al. | |
| 2022/0086466 A1 | 3/2022 | Holland et al. | |
| 2022/0391441 A1* | 12/2022 | Tange | G10K 15/02 |
| 2024/0121402 A1* | 4/2024 | Bampis | H04N 19/172 |
| 2024/0267532 A1* | 8/2024 | Zhernov | H04N 19/124 |

OTHER PUBLICATIONS

Extended European Search Report dated Jul. 23, 2025, from European Patent Application No. 25161697.5, 11 pp.

Zvezdakova et al., "Barriers Towards No-reference Metrics Application to Compressed Video Quality Analysis: on the Example of No-reference Metric NIQE," arXiv:1907.03842v2, 6 pp. (Aug. 2019).

ITU-T, "Parametric Bitstream-based Quality Assessment of Progressive Download and Adaptive Audiovisual Streaming Services over Reliable Transport—Video Quality Estimation Module," Recommendation ITU-T P.1203.1, 30 pp. (Jan. 2019).

ITU-T, "Video Quality Assessment of Streaming Services over Reliable Transport for Resolutions up to 4K with Access to Full Bitstream Information," Recommendation ITU-T P.1204.3, 24 pp. (Jan. 2020).

ITU-T, "Video Quality Assessment of Streaming Services over Reliable Transport for Resolutions up to 4K with Access to Transport and Received Pixel Information," Recommendation ITU-T P.1204.5, 30 pp. (Oct. 2023).

Li et al., "Toward a Practical Perceptual Video Quality Metric," Netflix Technology Blog, https://netflixtechblog.com/toward-a-practical-perceptual-video-quality-metric-653f208b9652, 30 pp. (Jun. 2016).

Lin et al., "PEA265: Perceptual Assessment of Video Compression Artifacts," *IEEE Trans. on Circuits and Systems for Video Technology*, vol. 30, No. 11, pp. 3898-3910 (Nov. 2020).

Lu et al., "Full-Reference Video Quality Assessment Considering Structural Distortion and No-Reference Quality Evaluation of MPEG Video," *Proc. IEEE International Conference on Multimedia and Expo*, 4 pp. (Aug. 2002).

Mittal et al,. "Making a 'Completely Blind' Image Quality Analyzer," *IEEE Signal Processing Letters*, vol. 22, No. 3, pp. 209-212 (Mar. 2013).

Mittal et al., "No-Reference Image Quality Assessment in the Spatial Domain," *IEEE Transactions on Image Processing*, vol. 21, No. 12, pp. 4695-4708 (Dec. 2012).

Moorthy et al., "Blind Image Quality Assessment: From Scene Statistics to Perceptual Quality," *IEEE Transactions Image Processing*, vol. 20, No. 12, pp. 3350-3364 (Dec. 2011).

Saad et al., "Blind Quality Assessment of Videos Using a Model of Natural Scene Statistics and Motion Coherency," *Asilomar Conference on Signals, Systems, and Computers*, 5 pp. (Nov. 2012).

Saad et al., "Model-Based Blind Image Quality Assessment: A Natural Scene Statistics Approach in the DCT Domain," *IEEE Transactions Image Processing*, vol. 21, No. 8, pp. 3339-3352 (Aug. 2012).

Sheikh et al., "No-Reference Quality Assessment Using Natural Scene Statistics: JPEG2000," *IEEE Transactions on Image Processing*, vol. 14, No. 11, pp. 1918-1927 (Nov. 2005).

Wang et al., "No. reference Perceptual Quality Assessment of JPEG Compressed Images," *Proc. IEEE International Conference on Image Processing*, 4 pp. (Sep. 2002).

* cited by examiner

FIG. 1     100
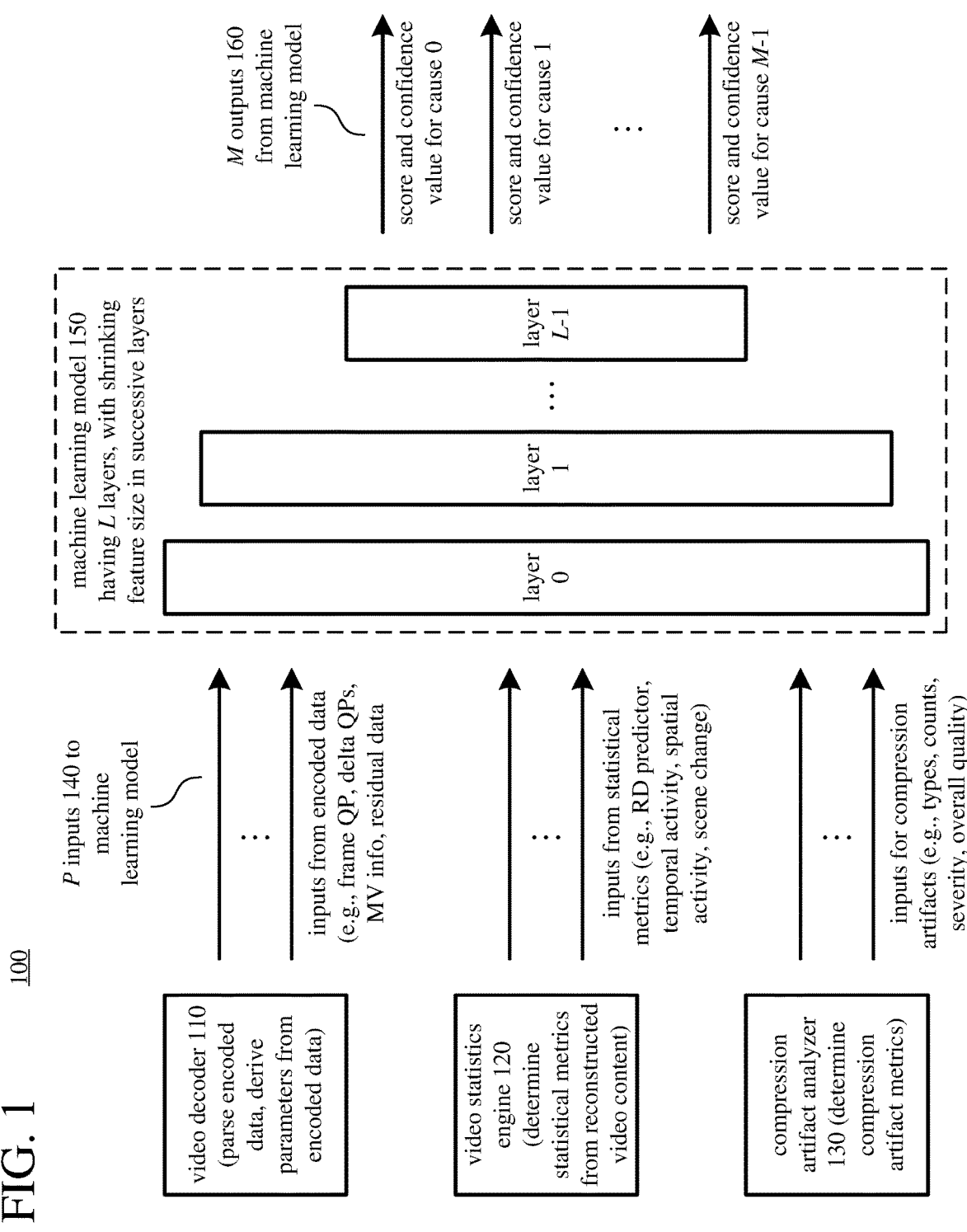

FIG. 2          <u>200</u>
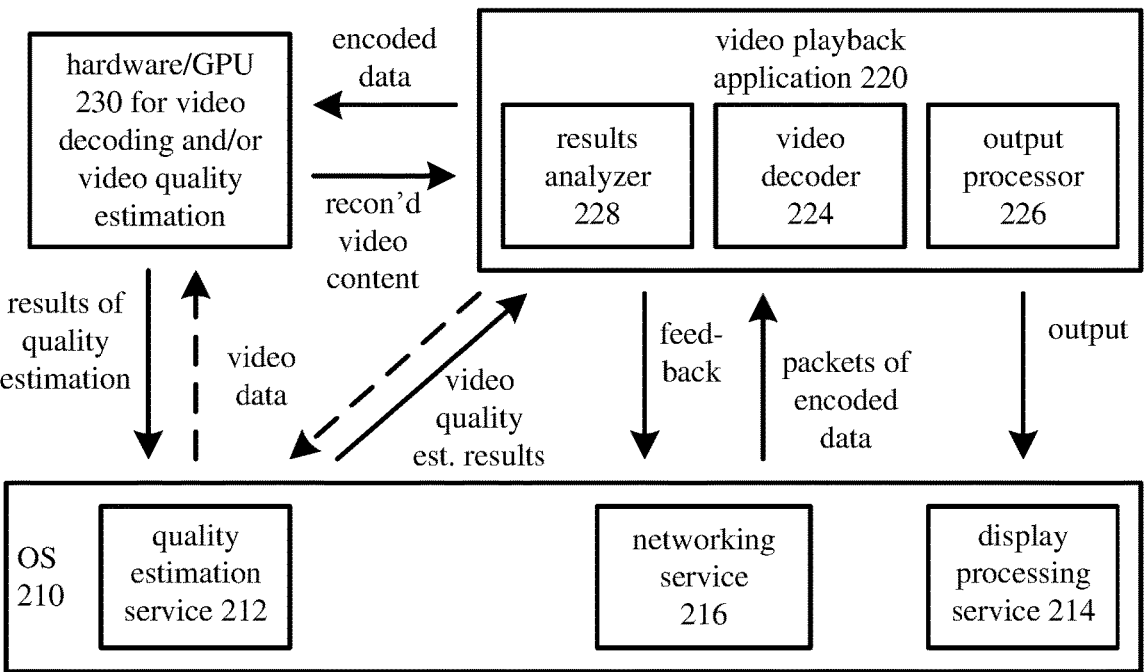

FIG. 3     300
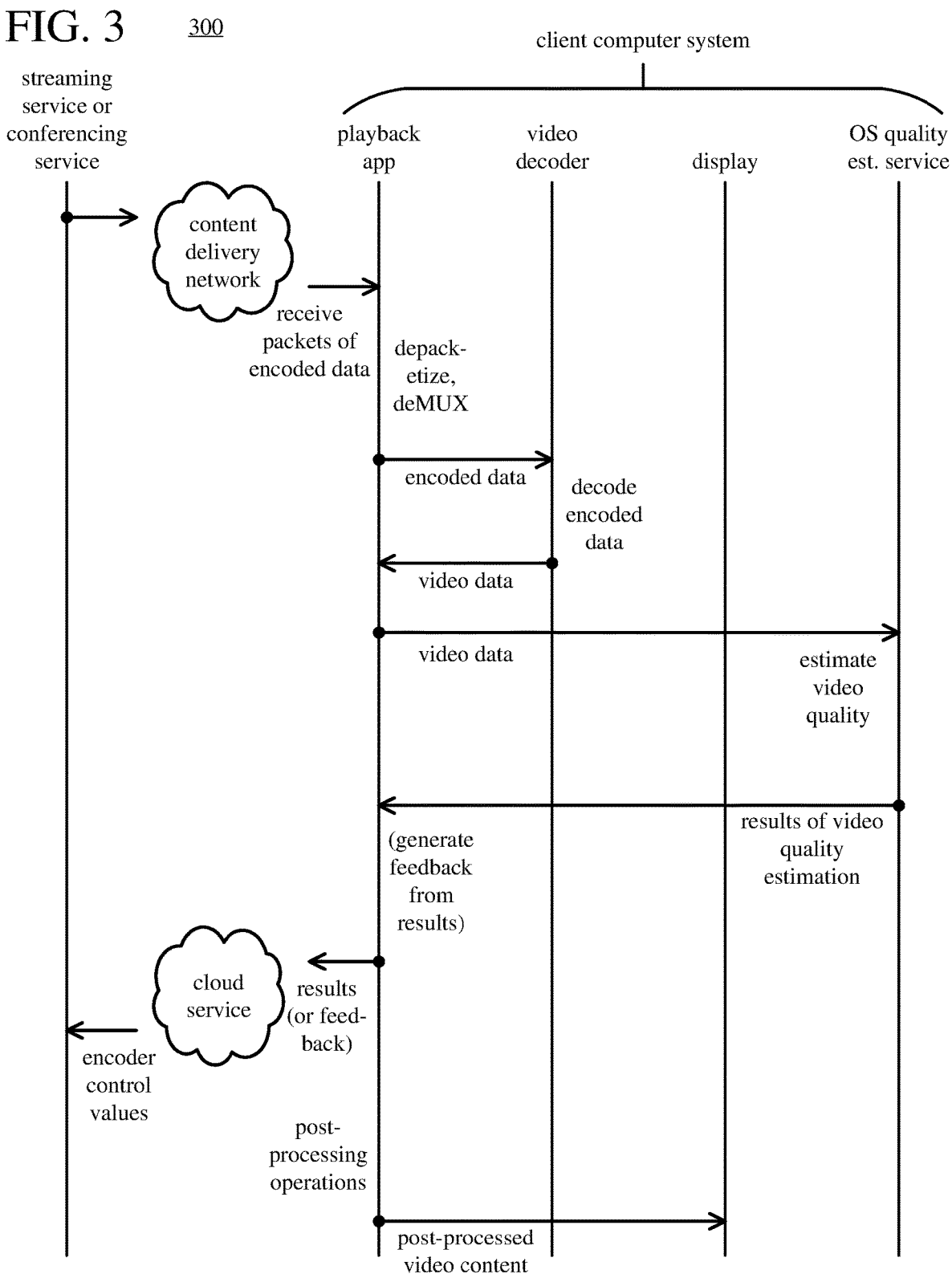

Figures 4, 5:
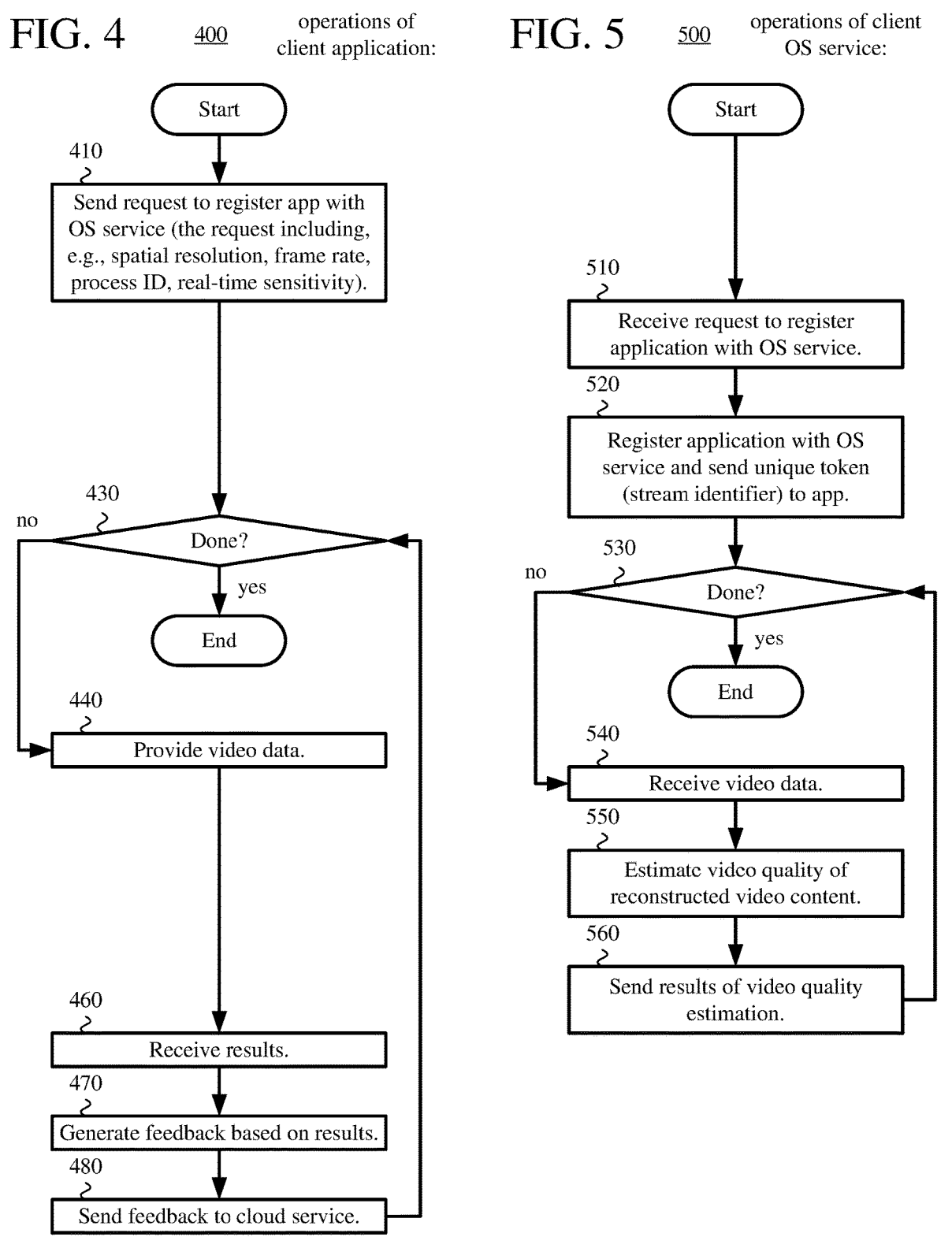

FIG. 4    400    operations of client application:

Start

410
Send request to register app with OS service (the request including, e.g., spatial resolution, frame rate, process ID, real-time sensitivity).

430
no
Done?

yes

End

440
Provide video data.

460
Receive results.

470
Generate feedback based on results.

480
Send feedback to cloud service.

FIG. 5    500    operations of client OS service:

Start

510
Receive request to register application with OS service.

520
Register application with OS service and send unique token (stream identifier) to app.

530
no
Done?

yes

End

540
Receive video data.

550
Estimate video quality of reconstructed video content.

560
Send results of video quality estimation.

Figure 6:
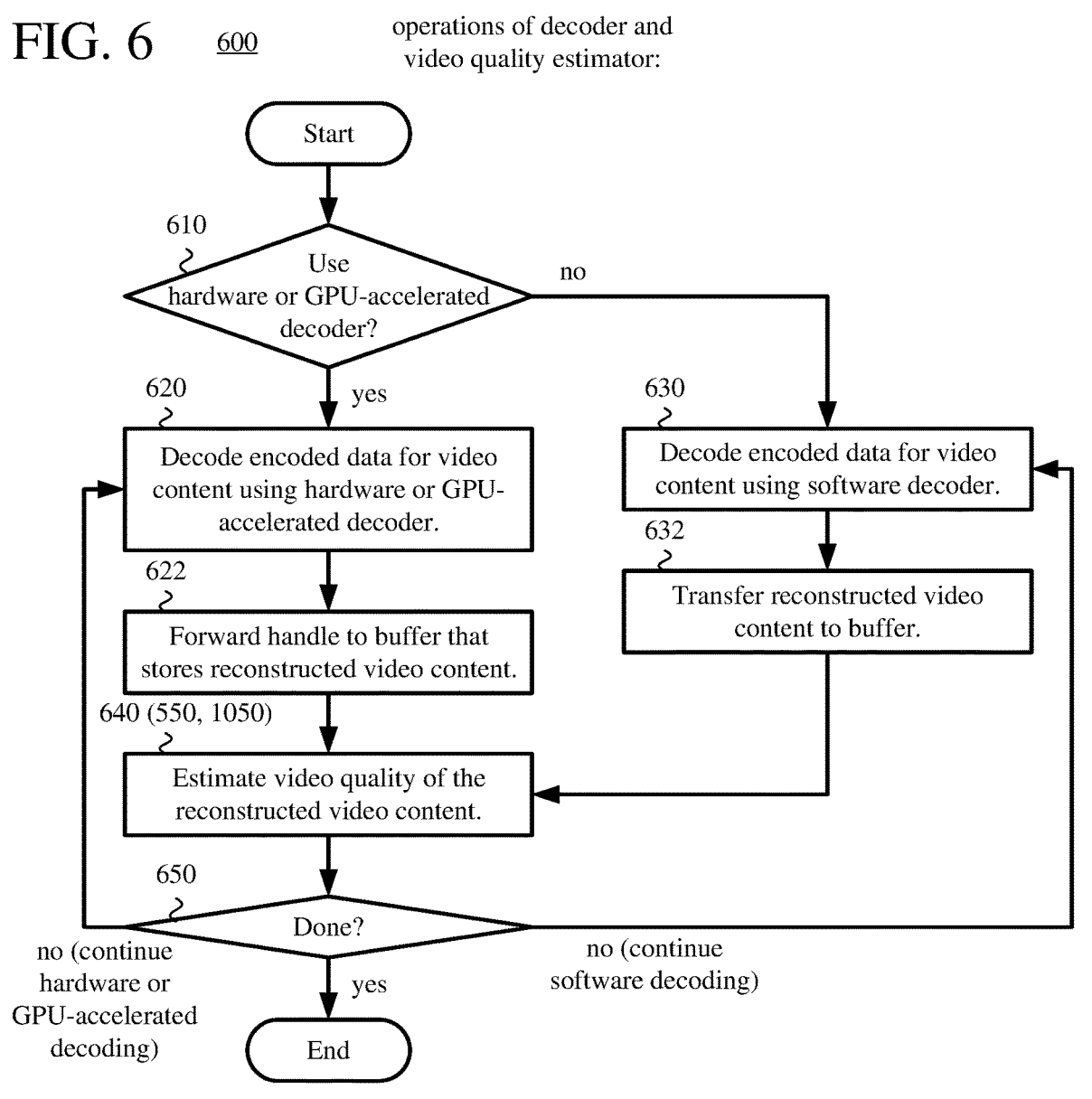

FIG. 6    600    operations of decoder and
video quality estimator:

```
                    ┌─────────────┐
                    │    Start    │
                    └─────────────┘
                           │
                           ▼
  610                 ╱─────────────╲
   ⌇               ╱       Use        ╲         no
           ╱ hardware or GPU-accelerated ╲──────────────┐
             ╲      decoder?        ╱                    │
               ╲─────────────────╱                      │
                       │                                │
  620                  │ yes                630         │
   ⌇                   ▼                     ⌇          ▼
  ┌──────────────────────────┐    ┌──────────────────────────┐
  │ Decode encoded data for  │    │ Decode encoded data for  │
  │ video content using      │    │ video content using      │
  │ hardware or GPU-         │    │ software decoder.        │
  │ accelerated decoder.     │    └──────────────────────────┘
  └──────────────────────────┘    632
  622                  │            ⌇       │
   ⌇                   ▼                    ▼
  ┌──────────────────────────┐    ┌──────────────────────────┐
  │ Forward handle to buffer │    │ Transfer reconstructed   │
  │ that stores reconstructed│    │ video content to buffer. │
  │ video content.           │    └──────────────────────────┘
  └──────────────────────────┘            │
  640 (550, 1050)      │                   │
   ⌇                   ▼                    │
  ┌──────────────────────────┐             │
  │ Estimate video quality   │◄────────────┘
  │ of the reconstructed     │
  │ video content.           │
  └──────────────────────────┘
  650                  │
   ⌇                   ▼
              ╱─────────────╲
            ╱     Done?       ╲
            ╲                 ╱
              ╲─────────────╱
                   │
                   │ yes
                   ▼
            ┌─────────────┐
            │     End     │
            └─────────────┘
``` no (continue
hardware or
GPU-accelerated
decoding)

no (continue
software decoding)

FIG. 7          <u>700</u>

FIG. 8     800     server computer system
implementing cloud service
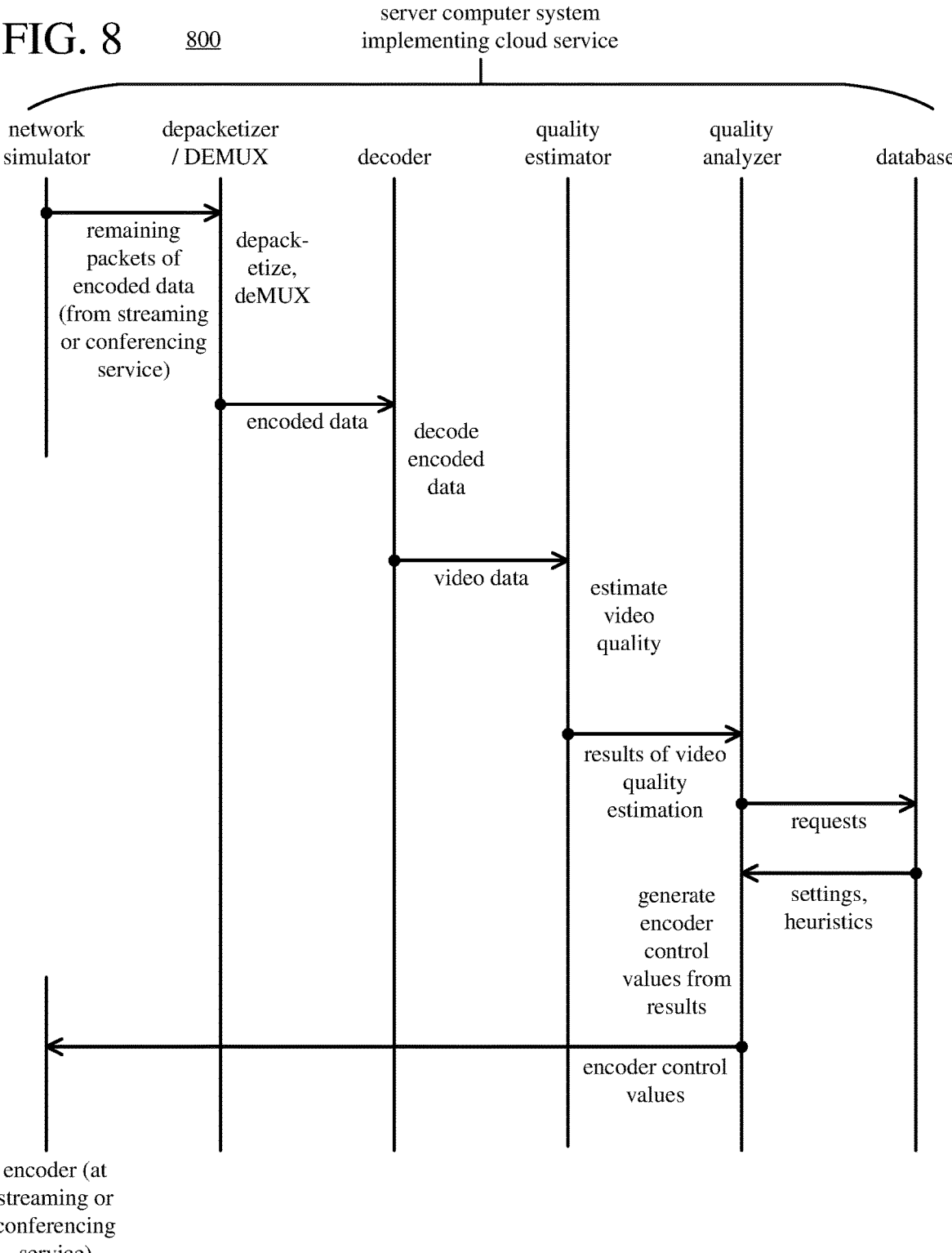

FIG. 9    <u>900</u> operations of
streaming service:

Start

910

Send request to register streaming
or conf. service with cloud service.

930 no

Done?

yes

End

970

Receive encoder control values.

980

Adjust encoder settings based at
least in part on control values.

990

Encode video content according to
the adjusted encoder settings.

FIG. 10    <u>1000</u> operations of
cloud service:

Start

1010

Receive request to register
streaming or conferencing service.

1020

Register streaming or conf. service
with cloud service.

1030 yes

Done?

no

1040

Receive video data.

1050

Estimate video quality of
reconstructed video content.

1060

Generate encoder control values
based at least in part on analysis
of results of the estimating the
video quality.

1070

Send encoder control values.

End software 1180 implementing one or more
innovations for video quality estimation

VIDEO QUALITY ESTIMATION WITH A MACHINE LEARNING MODEL AS AN OPERATING SYSTEM SERVICE OR CLOUD SERVICE

BACKGROUND

A video playback application executing on a client computer system can decode encoded data to reconstruct video content, process the reconstructed video content by cropping, scaling, or compositing the reconstructed video content with other content, and output the video content for display. Depending on the usage scenario, a video playback application can be a video streaming application, video conferencing application, or other type of video playback application. For example, a video streaming application can play back video content from a streaming service, or a video conferencing application can play back video content received as part of a video call or video conference.

In many cases, a video streaming service or video conferencing service seeks feedback about quality of the video that an application plays back. If it provides video quality feedback at all, however, a video playback application typically provides feedback that is inconsistent, unreliable, and collected in an intrusive way. For example, through a survey, feedback prompt, or other mechanism, a video playback application may ask a viewer to rate video quality after playback finishes. In many cases, a viewer does not respond or provides a response that is unclear. Even when viewers respond, such feedback is subjective—varying widely between viewers. Aside from being subjective and potentially bothersome to a user to collect, such feedback on video quality is neither timely nor detailed. The feedback is only available after playback has completed, and the feedback is essentially high-level. As another example, quality may be estimated by a video playback application using engagement time as a proxy, by tracking how long a viewer watches a video. Again, however, this type of feedback is not timely or detailed. Moreover, engagement time only loosely correlates with video quality in many scenarios. The absence of timely, detailed feedback about video quality limits the ability of video streaming services and video conferencing services to adapt how video content is encoded for delivery to clients.

SUMMARY

In summary, the detailed description presents innovations in video quality estimation. For example, for a portion of reconstructed video content, an operating system service of a client computer system receives video data, estimates video quality of the portion of reconstructed video content using the video data, and sends results of the video quality estimation to an application executing on the client computer system. Or, as another example, for a portion of reconstructed video content, a cloud service of a server computer system receives video data, estimates video quality of the portion of reconstructed video content using the video data, generates encoder control values based at least in part on analysis of results of the video quality estimation, and sends the encoder control values to a streaming or conferencing service. With video quality estimation provided as an operating system service or cloud service, estimates of video quality can be collected unobtrusively and without feedback from video playback applications or viewers. Moreover, estimates of video quality can be determined in a consistent way for different video streams, different video playback applications, and different client computer systems. Video quality can be estimated by the operating system service or cloud service objectively—not depending on different viewer preferences or lighting conditions—and in a fine-grained way. Detailed quality estimates can provide scores for different regions of a portion of reconstructed video content. Ultimately, using feedback based on video quality estimates that have been collected in a consistent and reliable manner, a streaming service or conferencing service can adjust subsequent video encoding to improve video quality and overall user experience.

According to a first set of techniques and tools described herein, an operating system service of an operating system of a client computer system performs operations to estimate video quality. In response to a request, an application can be registered with the operating system service. For a portion of reconstructed video content, the operating system service receives video data. For example, the video data include the portion of reconstructed video content (sample values), parameters derived or reconstructed from encoded data, statistics calculated from the encoded data, and/or metadata about the encoded data. Using the video data, the operating system service estimates video quality of the portion of reconstructed video content. For example, the operating system service calculates multiple constituent quality metrics for the portion of reconstructed video content and, using a machine learning model, maps the multiple constituent quality metrics to a video quality score. The quality metrics can be type-specific for different types of compression artifacts and/or region-specific for different regions of the portion of reconstructed video content. The operating system service sends, to the application, results of the video quality estimation. In this way, the operating system service can provide video quality estimates in a consistent, timely, and unobtrusive manner.

According to a second set of techniques and tools described herein, an application executing on a client computer system performs operations to interact with an operating system service that estimates video quality. The application can send, to the operating system service, a request to register the application, and the operating system service can register the application in response. For a portion of reconstructed video content, the application provides video data to the operating system service. The application receives, from the operating system service, results of estimating video quality of the portion of reconstructed video content, where the results have been generated with the operating system service. The application can generate feedback based at least in part on analysis of the results and send the feedback to a cloud service, streaming service, or conferencing service, which can adjust subsequent video encoding. In this way, video quality and overall user experience can be improved.

According to a third set of techniques and tools described herein, a cloud service of a server computer system performs operations to estimate video quality. In response to a request, the cloud service can register a streaming or conferencing service with the cloud service. For a portion of reconstructed video content, the cloud service receives video data. For example, the video data includes the portion of reconstructed video content (sample values), parameters derived or reconstructed from encoded data, statistics calculated from the encoded data, and/or metadata about the encoded data. Using the video data, the cloud service estimates video quality of the portion of reconstructed video content. For example, the cloud service calculates multiple constituent quality metrics for the portion of reconstructed video content and, using a machine learning model, maps the multiple constituent quality metrics to a video quality score. The quality metrics can be type-specific for different types of compression artifacts and/or region-specific for different regions of the portion of reconstructed video content. The cloud service generates encoder control values based at least in part on analysis of results of the video quality estimation. For example, the encoder control values include frame rate, spatial resolution, overall bit rate, intra frame distance, frame type, and/or quantization parameters. The cloud service sends the encoder control values to the streaming or conferencing service, which can use the encoder control values to adjust subsequent encoding. In this way, the cloud service can provide estimates of video quality in a consistent and timely way, even without feedback from any video playback application on a client computer system.

According to a fourth set of techniques and tools described herein, a streaming or conferencing service of a server computer system performs operations to interact with a cloud service that estimates video quality. In response to a request, the streaming or conferencing service can be registered with the cloud service. The streaming or conferencing service receives encoder control values from the cloud service, where the encoder control values have been generated based at least in part on analysis of results of video quality estimation by the cloud service. The streaming or conferencing service adjusts encoder settings based at least in part on the encoder control values and encodes video content according to the adjusted encoder settings. In this way, using encoder control values that have been provided by the cloud service to adjust video encoding, subsequent video quality and overall user experience can be improved.

The innovations described herein can be implemented as part of a method, as part of a computer system (physical or virtual) configured to perform the method, or as part of a tangible computer-readable media storing computer-executable instructions for causing a processor system, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1 is a diagram illustrating an example machine learning model architecture for estimating cause-specific scores for video quality.

FIG. 2 is a diagram illustrating an example architecture for video quality estimation using an operating system service at a client computer system.

FIG. 3 is a diagram illustrating operations of, and interactions between, a video playback application and modules of a client computer system, including an operating system service for estimating video quality.

FIG. 4 is a flowchart illustrating an example technique, from the perspective of an application executing on a client computer system, for interacting with an operating system service that estimates video quality.

FIG. 5 is a flowchart illustrating an example technique, from the perspective of an operating system service of an operating system of a client computer system, for estimating video quality.

FIG. 6 is a flowchart illustrating an example technique for selecting between video decoder implementations when estimating video quality.

FIG. 7 is a diagram illustrating an example architecture for video quality estimation using a cloud service at a server computer system.

FIG. 8 is a diagram illustrating operations of, and interactions between, modules of a cloud service for estimating video quality.

FIG. 9 is a flowchart illustrating an example technique, from the perspective of a streaming service or conferencing service that includes a video encoder, for interacting with a cloud service that estimates video quality.

FIG. 10 is a flowchart illustrating an example technique, from the perspective of a cloud service, for estimating video quality.

DETAILED DESCRIPTION

Figure 11:
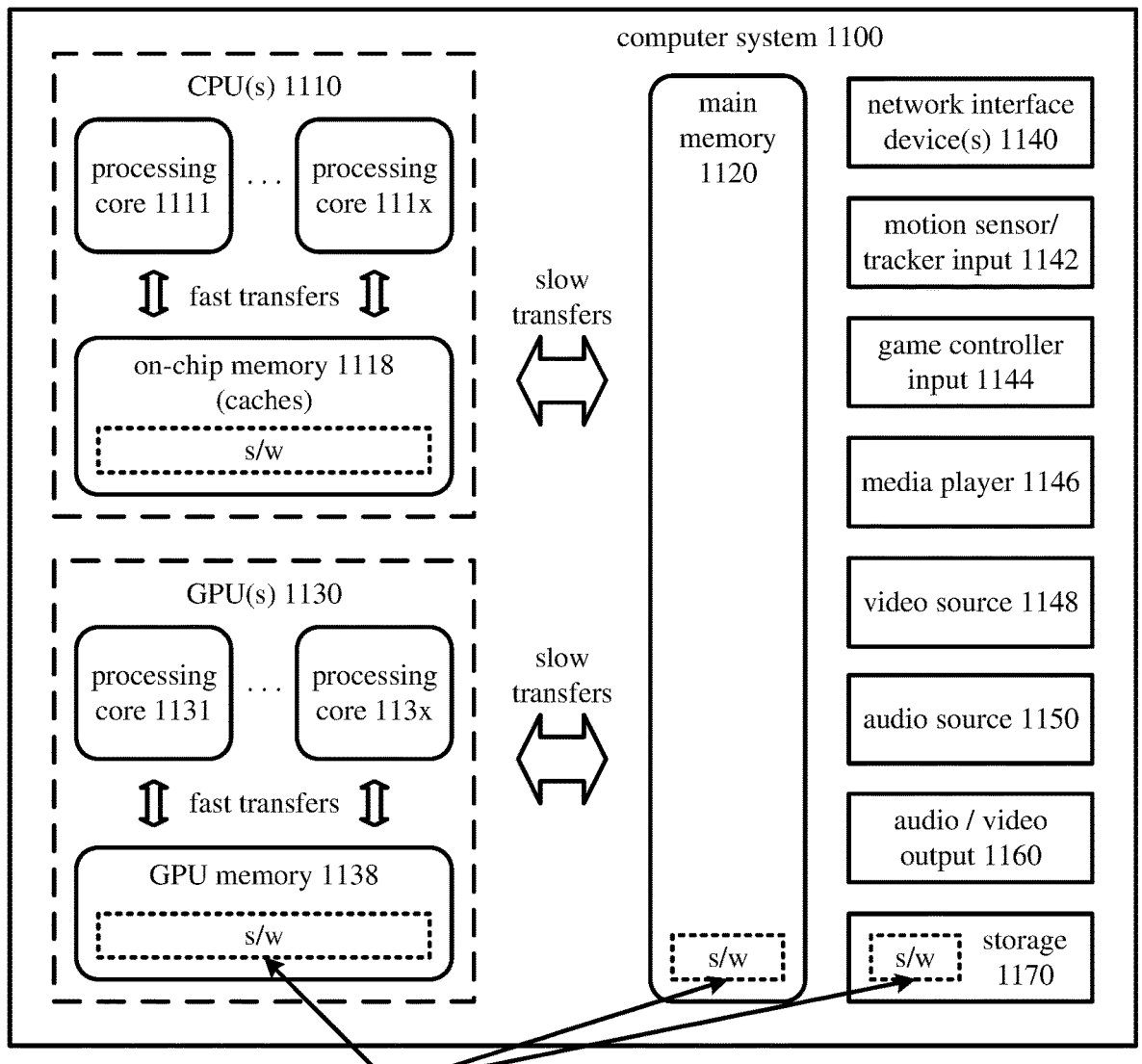
FIG. 11 is a diagram illustrating an example computer system in which some described embodiments can be implemented.

In a computer system, a user can consume video through a video streaming application, video conferencing application, or other video playback application. In prior approaches, a video playback application can collect and analyze user feedback about video quality and user satisfaction with the application.

In contrast, according to some approaches described herein, an operating system includes an operating system service for estimating video quality. An application can register with the operating system service and receive, for reconstructed video content that the application has rendered, results of video quality estimation by the operating system service. The application can analyze the results of video quality estimation (e.g., filtering results, aggregating results) before forwarding feedback to a streaming service, which can adjust subsequent video encoding based on the feedback.

For example, for a portion of reconstructed video content such as a frame, an operating system service of a client computer system receives video data, estimates video quality of the portion of reconstructed video content using the video data, and sends results of the video quality estimation to an application executing on the client computer system. The video quality estimation can use a machine learning model such as a convolutional neural network. In some example implementations, when estimating video quality, the operating system service calculates quality metrics that measure different types of compression artifacts in a portion of reconstructed video content and generates a video quality score based on the quality metrics. The video quality score can even be on the same scale as quality scores collected with user feedback according to prior approaches.

With video quality estimation provided as an operating system service, estimates of video quality can be collected unobtrusively and without feedback from video playback applications or viewers. Providing video quality estimation as an operating system service can also simplify the process of developing and maintaining video playback applications. Moreover, with video quality estimation provided as an operating system service, estimates of video quality can be determined in a consistent way for different viewers, different video streams, and different video playback applications on a client computer system. Video quality can be estimated by the operating system service objectively—not depending on different viewer preferences or lighting conditions—and in a fine-grained way. Detailed quality estimates can provide scores for different regions of a portion of reconstructed video content. Ultimately, using feedback based on video quality estimates by an operating system service, a streaming service or conferencing service can adjust subsequent video encoding to improve video quality and overall user experience.

According to other approaches described herein, a cloud service estimates video quality. A streaming or conferencing service can register with the cloud service and receive feedback (in the form of encoder control values) based on results of video quality estimation by the cloud service. The streaming or conferencing service can adjust subsequent video encoding based on the feedback.

For example, for a portion of reconstructed video content, a cloud service of a server computer system receives video data, estimates video quality of the portion of reconstructed video content using the video data, generates encoder control values based at least in part on analysis of results of the video quality estimation, and sends the encoder control values to a streaming or conferencing service. The video quality estimation can use a machine learning model such as a convolutional neural network. In some example implementations, when estimating video quality, the cloud service calculates quality metrics that measure different types of compression artifacts in a portion of reconstructed video content and generates a video quality score based on the quality metrics.

With video quality estimation provided as a cloud service, estimates of video quality can be collected unobtrusively, even without any feedback from video playback applications or viewers. Providing video quality estimation as a cloud service can also simplify the process of developing and maintaining video playback applications. Moreover, with video quality estimation provided as a cloud service, estimates of video quality can be determined in a consistent way for different viewers, different video streams, different video playback applications, and different client computer systems. The cloud service can simulate network effects such as dropping and reordering of packets to provide realistic estimates of video quality at client computer systems, even if no feedback is received from actual viewers or video playback applications at the client computer systems. Video quality can be estimated by the cloud service objectively—not depending on different viewer preferences or lighting conditions—and in a fine-grained way. Detailed quality estimates can provide scores for different regions of a portion of reconstructed video content. Ultimately, using feedback based on video quality estimates by a cloud service, a streaming service or conferencing service can adjust subsequent video encoding to improve video quality and overall user experience.

I. Example Metrics for Video Quality and Example Machine Learning Models for Video Quality Estimation This section describes example metrics for video quality as well as example machine learning models for estimating video quality. The example quality metrics and example machine learning models can be used in an operating system service or cloud service that estimates video quality of reconstructed video content.

A. Example Metrics for Video Quality

In general, in approaches described herein, video quality estimation works without access to original video content (from before encoding). As such, video quality estimation does not directly measure differences between reconstructed video content and original video content. Instead, the video quality estimation uses one or more metrics that consider video data without reference to original video content. For example, as the video data that is considered in quality estimation, the quality estimation uses sample values of reconstructed video content without the corresponding sample values of original video content. Or, as another example, as the video data that is considered in the quality estimation, the quality estimation uses parameters derived or reconstructed from the encoded data, statistics calculated from the encoded data, and/or metadata about the encoded data, which are available without original video content.

For example, video quality estimation can use a quality metric based on ITU-T Recommendation P.1203.1 ("Parametric Bitstream-based Quality Assessment of Progressive Download and Adaptive Audiovisual Streaming Services Over Reliable Transport-Video Quality Estimation Module"). For this quality metric, quality estimation uses metadata about encoded data (such as the type of codec, spatial resolution, temporal resolution, or bitrate), parameters derived from the encoded data (such as frame types or frame sizes), and/or other information in the encoded data. For additional details, see ITU-T Recommendation P.1203.1.

As another example, video quality estimation can use a quality metric based on ITU-T Recommendation P.1204.3 ("Video Quality Assessment of Streaming Services over Reliable Transport for Resolutions up to 4K with Access to Full Bitstream Information"). For this quality metric, quality estimation uses parameters derived from encoded data, such as quantization parameters and motion information. For additional details, see ITU-T Recommendation P.1204.3.

As another example, video quality estimation can use a quality metric based on ITU-T Recommendation P.1204.5 ("Video Quality Assessment of Streaming Services over Reliable Transport for Resolutions up to 4K with Access to Transport and Received Pixel Information"). For this quality metric, quality estimation uses metadata about encoded data, parameters derived from the encoded data, and sample values of reconstructed video content. For additional details, see ITU-T Recommendation P.1204.5.

As another example, video quality estimation can use a quality metric based on "Naturalness Image Quality Evaluator" ("NIQE") technology. For this quality metric, quality estimation uses spatial-domain features extracted from local image patches, which represent low-order characteristics of natural images. For additional details, see Mittal et al. "Making a Completely Blind Image Quality Analyzer," IEEE Signal Processing Letters, pp. 209-212, vol. 22, no. 3 (2013).

As another example, video quality estimation can use a quality metric based on "Blind Image Integrity Notator using DCT-Statistics" ("BLIINDS") technology. For this quality metric, quality estimation uses parameters (specifically, transform coefficients) derived from encoded data or reconstructed video content. For additional details, see Saad et al., "Model-Based Blind Image Quality Assessment: A Natural Scene Statistics Approach in the DCT Domain," IEEE Transactions Image Processing, pp. 3339-3352, vol. 21, no. 8 (2012).

As another example, video quality estimation can use a quality metric based on Video-BLIINDS technology. For this quality metric, quality estimation uses parameters (specifically, transform coefficients for frame differences) and motion information derived from encoded data or reconstructed video content, with prediction of scores based on features using a support vector machine. For additional details, see Saad et al., "Blind Quality Assessment of Videos Using a Model of Natural Scene Statistics and Motion Coherency," Asilomar Conference on Signals, Systems, and Computers (2012).

As another example, video quality estimation can use a quality metric based on "Blind/Referenceless Image Spatial Quality Evaluator" ("BRISQUE") technology. For this quality metric, quality estimation uses statistics based on sample values of reconstructed video content. For additional details, see Mittal et al., "No-Reference Image Quality Assessment in the Spatial Domain," IEEE Transactions on Image Processing (2012).

As another example, video quality estimation can use a quality metric based on "Distortion Identification-based Image Verity and Integrity Evaluation" ("DIIVINE") technology. For this quality metric, quality estimation uses statistics based on sample values of reconstructed video content. For additional details, see Moorthy et al., "Blind Image Quality Assessment: From Scene Statistics to Perceptual Quality," IEEE Transactions Image Processing, pp. 3350-3364, vol. 20, no. 12 (2011).

As another example, video quality estimation can use a quality metric that specifically measures block-based compression artifacts in reconstructed video content. For additional details, see Wang et al., "No-reference Perceptual Quality Assessment of JPEG Compressed Images," Proc. IEEE International Conference on Image Processing (2002) or Lu et al., "Full-Reference Video Quality Assessment Considering Structural Distortion and No-Reference Quality Evaluation of MPEG Video," Proc. IEEE International Conference on Multimedia and Expo (August 2002).

As another example, video quality estimation can use a quality metric that specifically measures blurring artifacts or ringing artifacts in reconstructed video content using natural scene statistics. For additional details, see Sheikh et al., "No-Reference Quality Assessment Using Natural Scene Statistics: JPEG2000," IEEE Transactions on Image Processing, vol. 14, no. 11 (2005).

As another example, video quality estimation can use a quality metric based on "Perceivable Encoding Artifacts" ("PEA265") technology. For this quality metric, quality estimation measures different types of compression artifacts, including blurring, blocking, ringing, color bleeding, flickering, and floating with different constituent quality metrics. For additional details, see Lin et al., "PEA265: Perceptual Assessment of Video Compression Artifacts," IEEE Transactions on Circuits and Systems for Video Technology, Vol. 30, No. 11 (2020).

As another example, video quality estimation can use a quality metric based on "Video Multimethod Assessment Fusion" ("VMAF") technology. For this quality metric, quality estimation uses multiple constituent quality metrics, which have different strengths and weaknesses in terms of characteristics of source content, types of compression artifacts, and degree of distortion. The different constituent quality metrics are fused into a final metric using a support vector machine that assigns weights to different metrics. The final metric can be a video quality score between 0 and 100, which has a high correlation to perceptual video quality. For additional details, see Li et al., "Toward a Practical Perceptual Video Quality Metric," Netflix Technology Blog, https://netflixtechblog.com/toward-a-practical-perceptual-video-quality-metric-653f208b9652.

More generally, video quality estimation can use a variation of statistical "activity" metric used in a typical video encoder, such as sum of absolute differences ("SAD") or another measure of activity derived from two-dimensional image variance, to estimate rate of change of content from between two frames. While typically calculated by comparing reconstructed sample values and corresponding original sample values, an activity metric can instead be calculated between corresponding sample values of two successive reconstructed frames (since original sample values are not available). Such an activity metric can be calculated at macroblock level, slice level, frame level, or other level. Thus, an activity metric can approximate spatial variations (activity) of regions within a frame (e.g., flat textures versus edges) and/or approximate temporal variations between frames. By using different constituent activity metrics, quality estimation can collect information from diverse contexts about why video may have excellent perceptual quality or poor perceptual quality. Quality metrics can be used in different stages of analysis. For example, if activity metrics measure a high degree of motion between a current frame and previous frame as well as high energy in residual data between the two frames, the activity metrics likely indicate a scene change or complex motion. If perceptual video quality drops for the current frame, additional activity metrics can be calculated for the current frame to provide additional information about potential causes of the drop in quality.

Alternatively, video quality estimation provided by an operating system service or cloud service can use other and/or additional quality metrics.

In general, quality metrics described herein estimate perceptual video quality. In other words, the quality metrics are designed to model (and objectively quantify) how human viewers perceive the quality of reconstructed video content. Feedback from human viewers may guide the design of the quality metrics but, for at least some of the quality metrics, is typically not incorporated thereafter into estimation of the quality of reconstructed video content.

B. Example Machine Learning Models for Video Quality Estimation

When an operating system service or cloud service estimates video quality, quality metrics calculated for a portion of reconstructed video content can be input to a machine learning model, which outputs a video quality score based on the quality metrics. For example, the machine learning model is a convolutional neural network ("CNN") that includes an input layer, one or more hidden layers, and an output layer.

In general, the input layer accepts inputs to the CNN. For example, the inputs are different quality metrics, which can be type-specific (associated with different types of compression artifacts), region-specific (associated with different regions of a portion of reconstructed video content), or both type-specific and region-specific. The quality metrics that are input to the CNN can be different constituent quality metrics for approaches described above, e.g., VMAF or PEA265. The inputs can be provided to the input layer on a frame-by-frame basis or on some other basis (for portions of reconstructed video content).

For p inputs, the input layer can include n neurons connected to the respective p inputs. The value of n depends on implementation. For example, n is 64. Other possible values of n are, for example, 128 and 32. In general, increasing the value of n increases the size and complexity of the CNN. This can improve the effectiveness of the model but may require more training and may result in overfitting of the model to training data. On the other hand, decreasing the value of n decreases the size and complexity of the CNN. This can simplify training but may limit the effectiveness of the model. The input layer implements a p×n mapping. The input layer can be a fully connected layer, for which each input is connected to each of the n neurons. Or, the input layer can have fewer connections to simplify the model.

The input layer uses an activation function such as a rectified linear unit ("ReLU") activation function, leaky ReLU activation function, or other activation function. In general, the activation function is an n×n decision, converting output signals from n neurons in one layer to be taken as inputs to n neurons in the next layer, which helps the CNN learn and recognize complex patterns in data. During training, the activation function changes how weights of neurons are captured. For example, the ReLU activation function is $f(x)=\max(0, x)$. As another example, the leaky ReLU activation function can be defined as $f(x)=\max(0.01\times x, x)$.

Each of the hidden layer(s) of the CNN includes a layer of neurons and uses an activation function. For example, the layer of neurons is a fully connected layer with n neurons, or a layer with fewer connections. The number of neurons can be the same or different in different layers. The activation function can be, for example, a ReLU activation function, leaky ReLU activation function, or other activation function. In general, the hidden layer(s) are trained to recognize patterns as different non-linear combinations of inputs from the input layer.

The output layer of the CNN produces as output a video quality score or multiple video quality scores for a portion of reconstructed video content or for a region of the portion of reconstructed video content. By repeating processing for different regions of the portion of reconstructed video content, the CNN can output quality scores for different regions of the reconstructed video content. The output layer can produce the video quality score(s) on a frame-by-frame basis or on some other basis. Different video quality scores for a portion of reconstructed video content (or region of a portion) can be associated with different possible causes of quality degradation in the reconstructed video content, and the different scores can have associated probability or confidence values. Alternatively, a video quality score for a portion of reconstructed video content (or region of a portion) can be an overall video quality score, which may have an associated probability or confidence value. The output layer includes a layer of neurons and uses an activation function. For example, the layer of neurons is a fully connected layer with n neurons, or a layer with fewer connections. The activation function is, for example, a sigmoid function that accepts a real number and produces an output in the range of 0.0 to 1.0. For example, the sigmoid function is $s(x)=1/(1+e^{-x})$. The output can then be scaled to another range for video quality scores, such as 1 to 5. The CNN can include other and/or additional features, such as a gated recurrent unit.

Alternatively, the machine learning model is another type of machine learning model, such as a support vector machine. In some example implementations, the machine learning model is a classifier such as a perceptron.

In general, the machine learning model can be generic (that is, trained for multiple different types of video content or arbitrary video content). Or, the machine learning model can be trained for a specific type of video content.

The machine learning model can be trained using actor-critic reinforcement learning. For example, for the CNN described above, an actor path provides a "player" or decision-maker during training. The actor selects an action (here, determining the output of the machine learning model) based on a policy, as reflected in the configuration of the CNN. A critic path provides an "observer" who grades the performance of the actor. The critic assesses whether being in the state that results from the action selected by the actor is valuable or not valuable. The critic quantifies whether the action is valuable or not valuable using a reward function, which depends on implementation. Training can use a data set with labels applied automatically based on conditions controlled (such as an objective measure of quality degradation like peak signal-to-noise ratio, structural similarity index, multi-scale structural similarity index, VMAF) when encoding training data and conditions observed (such as quality assessments from users) when encoding the training data. Based on the value of the reward function, the CNN is adjusted. For example, if one or more neuron weight values or bias values have been adjusted in an iteration of training the CNN, and the resulting value of the reward function increases, the training process keeps the adjusted values or increases the magnitude of the previous adjustments in the next iteration of training. On the other hand, if the resulting value of the reward function decreases, the training process reverses the previous adjustments (to neuron weight value(s) and/or bias value(s)) or decreases the magnitude of the previous adjustments in the next iteration of training. The training process can use a Proximal Policy Optimization ("PPO") approach to adjust parameters of the CNN based on the value of the reward function. Alternatively, the training process can use another approach (such as Actor Critic with Experience Replay or Trust Region Policy Optimization) to adjust parameters of the CNN based on the value of the reward function.

In the preceding examples, the machine learning model is trained using a variation of actor-critic reinforcement learning. Alternatively, the machine learning model can be trained using another type of reinforcement learning. Or, the machine learning model can be trained using supervised learning, unsupervised learning, or another variation of machine learning.

Typically, the machine learning model is trained using a GPU. After training, however, the machine learning model be used in a non-GPU implementation.

In some example implementations, video quality estimation determines different constituent quality metrics that measure different types of compression artifacts, for example, as in the PEA265 approach. Histograms for different types of compression artifacts can be collected on a per frame basis and also can be collected across a video clip, indicating which frames have the different types of compression artifacts. Values in the histogram provide data points for perceptual video quality estimation.

When the number or extent of compression artifacts tracked in the histogram deviates from the expected average for a given bitrate or resolution (potentially indicating a network problem, change in content complexity, or other incident), the video quality estimation determines additional constituent quality metrics for one or more frames in a sliding window of frames. The additional constituent quality metrics provide additional information about the increase in compression artifacts. The additional constituent quality metrics can include information derived from encoded data (such as number of non-zero motion vectors, amount of residual data, and quantization parameter values) on a per frame basis or within the sliding window. The additional constituent quality metrics can also include statistical measures such as SAD or other activity measures, which may indicate a scene change, a period of unexpectedly high motion, or a period of unexpectedly heavy quantization (with corresponding loss of detail due to quantization parameter values that are too high).

In the example implementations, the constituent quality metrics derived from the encoded data and the statistical measures are input to a multi-input, multi-layer perceptron or other machine learning model that correlates the input data points to multiple outputs, which provide the results of video quality estimation. The multiple outputs (scores) can be associated with different explanations (reasons, causes) for poor perceptual video quality, such as a high degree of motion in content, higher than needed quantization parameter values (at frame level and/or for regions within a frame such as slices, coding tree units, or macroblocks), a scene change, or bitrate that is too low. For each possible output (video quality score), the machine learning model can produce a probability value or confidence value associated with the output. The machine learning model can be trained through back-propagation, e.g., using a GPU platform. Once trained, the machine learning model can be pruned and deployed, e.g., on a neural processing unit or inference-only device, to estimate perceptual video quality in real time.

Whereas the information in the histogram summarizes compression artifacts, the outputs of the machine learning model indicate possible causes of the compression artifacts, along with confidence values for the possible causes. When assessed over a variety of users and content, the outputs (video quality scores) and confidence values can be used to quickly identify the reasons for compression artifacts.

FIG. 1 shows an example machine learning model architecture (100) for estimating cause-specific scores for video quality. The example machine learning model architecture (100) includes a video decoder (110), a video statistics engine (120), and a compression artifact analyzer (130) that are configured to provide inputs (140) to a machine learning model (150). The machine learning model (150) is configured to produce, as outputs (160), cause-specific scores and corresponding confidence values for video quality.

The video decoder (110) is configured to parse encoded data for video content and derive one or more inputs for the machine learning model (150) based on syntax elements in the encoded data. Examples of parameters derived from encoded data are described above. Some of the inputs can be parameters directly signaled as syntax elements in the encoded data. Other inputs can be parameters reconstructed from syntax elements in the encoded data. For example, the video decoder (110) is configured to produce inputs such as: frame-level quantization parameter values; delta (differential) quantization parameter values for slices, coding tree units, macroblocks, or other regions of a frame, which indicate variations of quantization within a frame; motion vector information for blocks, which may be organized as a motion vector map; and residual data values. Alternatively, the video decoder (110) is configured to produce other and/or additional inputs to the machine learning model (150) based on encoded data for video content. The video decoder (110) is also configured to decode the encoded data for the video content, which produces reconstructed video content.

The video statistics engine (120) is configured to determine one or more inputs for the machine learning model (150) based on analysis of sample values of reconstructed video content. To do so, the video statistics engine (120) can compare sample values of a current frame of reconstructed video content to corresponding sample values (at the same locations) in one or more previous frames of reconstructed video content. The inputs can be various types of statistical measures, as described above. For example, the video statistics engine (120) is configured to produce inputs such as: a rate distortion predictor, which predicts quantization parameter values for frames and/or regions; a metric that quantifies temporal activity in terms of motion and/or a SAD metric; a metric that quantifies spatial activity in terms of two-dimensional variance; and a metric that quantifies likelihood of a scene change. Alternatively, the video statistics engine (120) is configured to produce other and/or additional inputs to the machine learning model (150) based on analysis of sample values of reconstructed video content.

The compression artifact analyzer (130) is configured to determine compression artifact metrics for reconstructed video content. The compression artifact metrics can quantify blurring, blocking, ringing, color bleeding, flickering, and/or floating with different quality metrics, as described above. For example, the compression artifact analyzer (130) is a CNN-based tool. In FIG. 1, the compression artifact analyzer (130) is configured to produce inputs such as: indicators of types of compression artifacts; counts of different types of compression artifacts per region, per frame, and/or per GOP; indicators of severity for different compression artifacts, and overall video quality scores per region, per frame, and/or per GOP. Alternatively, the compression artifact analyzer (130) is configured to produce other and/or additional inputs to the machine learning model (150) that quantify compression artifacts in reconstructed video content.

Collectively, the video decoder (110), video statistics engine (120), and compression artifact analyzer (130) are configured to produce P inputs (140) to the machine learning model (150). The value of P depends on implementation. For example, P is 32, 64, or 128.

The machine learning model (150) is configured to accept the P inputs (140). The machine learning model (150) has L layers, including an input layer, one or more hidden layer, and an output layer. The value of L depends on implementation. For example, L is 3, 8, or 16. As shown in FIG. 1, the number of features in successive layers of the machine learning model (150) can shrink, such that the number of M outputs (160) is less than the number of P inputs (140). The machine learning model (150) can be trained as described above.

The machine learning model (150) is configured to produce M outputs (160), which are cause-specific scores for video quality. The cause-specific scores may have corresponding confidence values associated with the respective scores. The value of M depends on implementation. For example, M is 2, 4, or 8. The outputs (160) are associated with different explanations for poor perceptual video quality, such as a high degree of motion in content, higher than needed quantization parameter values, a scene change, or bitrate that is too low. In the example of FIG. 1, for each possible output, the machine learning model (150) is configured to produce a confidence value associated with the output, for example, in the range of 0 to 100 or in the range of 0.0 to 1.0.

The machine learning model (150) can be implemented as part of an operating system service, as part of a cloud service, or as part of another service. Alternatively, the machine learning model (150) can be implemented in some other type of quality estimation tool.

The results of the quality estimation by the operating system service or cloud service can be provided in a message. The message can organize the results using formatting according to JavaScript Object Notation ("JSON"). Alternatively, the message can be organized in some other way.

In some examples, the results of video quality estimation returned by an operating system service or cloud service include video quality scores for portions of reconstructed video content. In other examples, the results of video quality estimation returned by an operating system service or cloud service include video quality scores for regions (e.g., slices, coding tree units, blocks) of a portion of reconstructed video content. Alternatively, the results of video quality estimation returned by an operating system service or cloud service include type-specific quality metrics for different types of compression artifacts as described above, region-specific quality metrics for different regions as described above, or quality metrics that are both type-specific and region-specific. In any case, in some example implementations, because of privacy rules, results are abstracted to remove semantic or descriptive details about the reconstructed video content.

C. Innovative Features

The following table shows some of the innovative features described herein for a machine learning model for video quality estimation.

| | Feature |
|---|---|
| A1 | In a computer system comprising a processor system and memory, a method comprising: receiving, at an input layer of a machine learning model implemented using the processor system and memory, P inputs, wherein P is an integer greater than or equal to 2, the P inputs including: a first set of inputs based on syntax elements in encoded data for video content; a second set of inputs that quantify results of analysis of sample values of reconstructed video content; and a third set of inputs that quantify different types of compression artifacts in the reconstructed video content; processing, in a set of hidden layers of the machine learning model, the P inputs, thereby producing M outputs; and outputting, from an output layer of the machine learning model, the M outputs, wherein M is an integer greater than or equal to 1, and wherein each of the M outputs is a cause-specific score associated with a different explanation for poor perceptual video quality. |
| A2 | The method of A1, wherein the first set of inputs includes: a parameter directly signaled as a syntax element in the encoded data; and a parameter reconstructed from multiple syntax elements in the encoded data. |
| A3 | The method of A1, wherein the first set of inputs includes one or more of: a frame-level quantization parameter value; delta quantization parameter values for regions of a frame; motion vector information; and residual data values. |
| A4 | The method of any one of A1 to A3, wherein the first set of inputs is received from a video decoder, the video decoder also being configured to decode the encoded data, thereby producing the reconstructed video content. |
| A5 | The method of any one of A1 to A4, wherein the second set of inputs includes one or more of: a rate distortion predictor; a metric that quantifies temporal activity; a metric that quantifies spatial activity; and a metric that quantifies likelihood of a scene change. |
| A6 | The method of any one of A1 to A5, wherein the sample values of the reconstructed video content include sample values of a current frame, and wherein the second set of inputs is received from a video statistics engine, the video statistics engine being configured to compare the sample values of the current frame to corresponding sample values of a previous frame. |
| A7 | The method of any one of A1 to A6, wherein the different types of compression artifacts include blurring, blocking, ringing, color bleeding, flickering, and/or floating. |
| A8 | The method of any one of A1 to A6, wherein the third set of inputs includes one or more of: indicators of the different types of compression artifacts; counts for the different types of compression artifacts per region, per frame, and/or per group of picture; indicators of severity for the different types of compression artifacts; and overall video quality scores per region, per frame, and/or per group of pictures. |
| A9 | The method of any one of A1 to A8, wherein the third set of inputs is received from a compression artifact analyzer. |
| A10 | The method of any one of A1 to A9, wherein the set of hidden layers includes multiple hidden layers, and wherein, in successive layers among the multiple hidden layers, a number of features per layer shrinks. |

-continued

| Feature |
| --- |
| A11 | The method of any one of A1 to A10, wherein the explanation of poor perceptual video quality is selected from the group consisting of high degree of motion, higher than needed quantization parameter values, a scene change, and bitrate that is too low. |
| A12 | The method of any one of A1 to A11, wherein the cause-specific score has an associated confidence value. |
| A13 | The method of any one of A1 to A12, wherein the machine learning model is a convolutional neural network. |
| A14 | The method of any one of A1 to A13, wherein the machine learning model is trained for multiple different video content types. |
| A15 | The method of any one of A1 to A13, wherein the machine learning model is trained for a specific video content type. |
| A16 | The method of any one of A1 to A15, further comprising, in an iteration of training of the machine learning model: determining a value of a reward function from results of processing training data with the machine learning model; and based on the value of the reward function, adjusting weight values and/or bias values of the set of hidden layers. |
| A17 | The method of any one of A1 to A16, wherein the encoded data is for a portion of the video content, and wherein the portion of the video content is a video frame. |
| A18 | The method of any one of A1 to A17, wherein the machine learning model is implemented as part of an operating system service, as part of a cloud service, as part of another service, or as part of a quality estimation tool. |
| A19 | One or more computer-readable media having stored thereon computer-executable instructions for causing a processor system, when programmed thereby, to perform operations of the method of any one of A1 to A18. |
| A20 | A computer system comprising a processor system and memory, wherein the computer system is configured to perform operations of the method of any one of A1 to A18. |

D. Technical Effects

With video quality estimation provided using a machine learning model, estimates of video quality can be determined in a consistent way for different video streams played back by a video playback application at a given client computer system, or for video streams played back by different video playback applications at a given client computer system. Quality estimates can be fine-grained. Detailed quality estimates can provide scores for different regions of a portion of reconstructed video content. Video quality can be estimated objectively—in a way that does not depend on different viewer preferences or lighting conditions. Moreover, from the perspective of a user, quality estimates can be computed unobtrusively.

With estimates of video quality that have been collected in a consistent and reliable manner, the estimates can be used to provide feedback to a streaming service or conferencing service, which can adjust video encoding in ways that improve subsequent video quality and improve the overall user experience.

II. Example Analysis of Results of Video Quality Estimation

An operating system service can provide results of video quality estimation to a video playback application. In a cloud service, a quality estimator can provide results of video quality estimation to an analyzer. The video playback application or quality analyzer can generate feedback based on analysis of the results of video quality estimation, then provide the feedback to a streaming service or conferencing service. In some examples, the feedback from a quality analyzer of a cloud service is encoder control values. The streaming or conferencing service can react to the feedback as it deems appropriate (e.g., adjust encoder settings or not adjust encoder settings).

When generating feedback based on analysis of the results of video quality estimation, the video playback application (in the operating system service approach) or the quality analyzer (in the cloud service approach) can filter results to eliminate outlier values. For example, the video playback application or quality analyzer can drop results that differ by more than a high threshold from earlier results and later results in a time window. The high threshold can be y %, where y is a value such as 100 that depends on implementation. The video playback application or quality analyzer can also filter results to eliminate results that differ from other results in a time window by less than a low threshold amount. The low threshold amount can be z %, where x is a value such as 5 that depends on implementation. In this way, the video playback application or quality analyzer can stabilize values in the feedback over time and potentially avoid over-reactions or "thrashing."

When generating feedback based on analysis of the results of video quality estimation, the video playback application (in the operating system service approach) or the quality analyzer (in the cloud service approach) can aggregate results. For example, the video playback application or quality analyzer can combine results from different portions of reconstructed video content in a time window to average or otherwise smooth a trend in the results. Or, as another example, the video playback application or quality analyzer can combine results from different regions of a portion of reconstructed video content.

By setting values in the feedback, the video playback application or quality analyzer can cause the streaming or conferencing service to react quickly, react slowly, or not react at all to the feedback. Based on trends in the feedback, the streaming or conferencing service can itself take different action depending on whether a trend is expected to continue (e.g., due to a complexity bump in the video content), expected to end (e.g., due to a decrease in complexity of video content), or not expected at all.

With respect to the cloud service approach, feedback generated by a quality analyzer based on video quality estimates from a quality estimator can be encoder control values. The quality analyzer provides encoder control values to the streaming service or conferencing service according to a protocol established between the cloud service and streaming/conferencing service. The encoder control values depend on encoder options and analyzer capabilities. For example, the encoder control values can indicate changes to various encoder settings, such as frame rate, spatial resolution, overall bitrate, frame type (P frame versus I frame), or quantization parameters. The quantization parameters can be set per frame, per color component, and/or per region. By adjusting quantization parameters, a region of interest can be encoded with higher quality.

For example, if the video quality estimate for a particular color component or region is lower than expected (for a given bitrate or resolution), the quality analyzer can specify encoder control values that cause decreases to quantization parameters, which may have been higher than needed. On the other hand, if the video quality estimate for a particular color component or region is higher than expected, the quality analyzer can specify encoder control values that cause increases to quantization parameters, which may have been lower than desired.

More generally, if the video quality estimate for a portion of reconstructed video content is lower than expected, the quality analyzer can specify encoder control values that cause an increase in overall bitrate (or even spatial resolution or frame rate), which may have been set too low. On the other hand if the video quality estimate for a portion of reconstructed video content is higher than expected, the quality analyzer can specify encoder control values that cause a decrease in overall bitrate (or even spatial resolution or frame rate), which may have been set to high.

Video quality scores for different frames can have varying impact on future encoding operations. For example, a low video quality score or scores for a key frame (an intra-coded frame that starts a group of pictures ("GOP") and is used as a reference picture for one or more other pictures) can indicate an impact on quality of many successively coded frames that rely on the key frame, until the next key frame. Compression artifacts observed in a key frame may impact video quality with more severity than compression artifacts observed in other types of frames. Thus, as another example, if the video quality estimate for a series of portions of reconstructed video content is very low, or a score for a portion of reconstructed video content indicates a scene change has likely occurred, the quality analyzer can specify that a new I frame (key frame) should be used in encoding.

In some example implementations, the quality analyzer can provide encoder control values to accomplish rate control based on the video quality estimates. For example, if reducing overall bitrate does not lead to lower video quality estimates for reconstructed video content, the quality analyzer can further reduce overall bitrate in encoder control values. The quality analyzer can continue to reduce overall bitrate in the encoder control values until the point that estimated video quality begins to decrease. The quality analyzer can increase overall bitrate in the encoder control values if video quality estimates are suddenly lower, which might be caused, for example, by high motion or another increase in complexity of the reconstructed video content, or if a score directly indicates high motion or another increase in complexity of the reconstructed video content.

In some example implementations, a database stores encoder settings and/or heuristic rules that the quality analyzer can use when setting encoder control values. For example, the encoder settings and/or heuristic rules associate different quality estimation results (such as different values for scores associated with different causes of low video quality such as high motion, quantization parameter values that are too high, a scene change, or bitrate that is too low) with different encoder control values and different effective bandwidths.

III. Example Operating System Services for Estimating Video Quality

This section describes various features of example operating system services for estimating video quality. With video quality estimation provided as an operating system service, estimates of video quality can be collected in a way that does not rely on feedback from any video playback application or user. Instead, quality estimation can be performed as part of separate processing at a client computer system. Moreover, with video quality estimation provided as an operating system service, estimates of video quality can be determined in a consistent way for different video streams, different networking scenarios, and different video playback applications at the client computer system. Quality estimates can be fine-grained, with scores provided for different regions of a portion of reconstructed video content. With estimates of video quality that have been collected in a consistent and reliable manner, a video playback application (or other module) can use the results of quality estimation to provide feedback to a streaming service or conferencing service, which can adjust video encoding in ways that improve subsequent video quality and improve the overall user experience.

A. Example Architectures

FIG. 2 shows an example architecture (200) for video quality estimation using an operating system service at a client computer system. The example architecture (200) includes an operating system (210) and a playback application (220). The operating system (210) includes a quality estimation service (212), a display processing service (214), and a networking service (216), among other operating system services (not shown). The playback application (220) includes a video decoder (224), an output processor (226), and a results analyzer (228). The example architecture (200) can also include special-purpose hardware or a GPU (collectively shown as 230) for video decoding and/or video quality estimation.

In the operating system (210), the networking service (216) is configured to receive packets of encoded data from a streaming service or conferencing service and provide the packets of encoded data to a depacketizer/demultiplexer ("DEMUX"). The depacketizer/DEMUX is configured to receive and process a series of packets of encoded data in containers (organized according to a container format such as ISO/IEC 14496-12, ASF, WebM, or another container format). In particular, the depacketizer/DEMUX is configured to remove encoded data for video content from the containers. Depending on implementation, the depacketizer/DEMUX can de-packetize encoded data that has been aggregated for transmission as a media stream, in which case the depacketizer/DEMUX parses syntax elements added as part of the syntax of the media transmission stream. Or, more generally, the depacketizer/DEMUX can implement one or more media system demultiplexing protocols or transport protocols, in which case the depacketizer/DEMUX parses syntax elements added as part of the syntax of the protocol (s). The depacketizer/DEMUX can be implemented as part of the operating system (210) or video playback application (220). Alternatively, operations of the depacketizer/DE-MUX can be split between the operating system (210) and the video playback application (220).

The video decoder (224) is configured to receive encoded data in an elementary bitstream (compliant with a standardized codec format or proprietary codec format) and decode the encoded data to produce reconstructed video content. The video decoder (224) can be a general-purpose decoding tool capable of operating in any of multiple decoding modes such as a low-latency decoding mode for live streaming or real-time communication and a regular decoding mode for video playback from a file or stream, or it can be a special-purpose decoding tool adapted for one such decoding mode. The video decoder (224) can be implemented using a software decoder, using special-purpose hardware, or using a GPU. Also, although FIG. 2 shows the video decoder (224) integrated into the video playback application (220), the video decoder (224) can alternatively be separate from the video playback application (220) (e.g., provided as part of an application library or operating system service). Generally, the video decoder (224) includes multiple decoding modules that perform decoding tasks such as entropy decoding, inverse quantization, inverse frequency transforms, and prediction. The exact operations performed by the video decoder (224) can vary depending on codec format.

The video playback application (220) registers with the operating system service (212). For example, the playback application (220) sends a request to register to the operating system service (212). As part of the request, the playback application (220) can specify parameters describing a given video stream, such as spatial resolution, frame rate, and real-time sensitivity for quality estimation (e.g., very sensitive to delay, somewhat sensitive to delay, or not sensitive to delay), as well as a process identifier for the video playback application (220). The operating system service (212) can respond with an indicator of whether registration has succeeded or failed. If registration succeeds, the operating system service (212) can further provide an indication of whether the operating system service (212) can comply with the requested real-time sensitivity for quality estimation. Also, if registration succeeds, the operating system service (212) can provide a unique token such as a unique token number or other universally unique identifier ("UUID") to the playback application (220). The unique token is essentially a stream identifier associated with the given video stream for purposes of video quality estimation. The playback application (220) can use the unique token to request and/or identify results of video quality estimation for the given video stream. If the playback application (220) crashes after providing video data to the operating system service (212) then subsequently resumes operation, the playback application (220) can use the unique token to recover results of video quality estimation. The indicators provided by the operating system service (212) can be provided as part of a JSON message or other message. In the message, a single value can provide multiple indicators (e.g., an indicator of success, an indicator that the requested real-time sensitivity is acceptable, and a unique token for a given video stream).

The video playback application (220) can request and receive video quality estimates for a single video stream or multiple video streams. After registration, different unique tokens for different streams can be used by the playback application (220) and the operating system service (212) to designate results of video quality estimation for the different streams over time.

In the operating system (210), the quality estimation service (212) is configured to estimate video quality of reconstructed video content and to produce results of the video quality estimation. As input, the quality estimation service (212) can accept various types of video data, such as reconstructed video content (sample values), parameters derived or reconstructed from the encoded data (such as quantization parameters, motion vector values, transform coefficient values, mode decisions), statistics calculated from the encoded data, or metadata about the encoded data (such as spatial resolution, temporal resolution, bitrate, or codec). The results can be, for example, a video quality score or multiple scores for a portion of reconstructed video content or, for each of multiple regions of the portion of reconstructed video content, a region-specific video quality score or scores for the region. In particular, the quality estimation service (212) is configured to perform operations as described in section I to estimate video quality.

As shown in FIG. 2, the video decoder (224) and quality estimation service (212) can use special-purpose hardware or a GPU (230) for video decoding operations and quality estimation operations. In this case, the video decoder (224) is configured to provide encoded data (or partially decoded data after operations such as entropy decoding) to the hardware or GPU (230) for decoding operations. The hardware or GPU (230) is configured to perform video decoding operations and return reconstructed video content to the video playback application (220) for output processing. The hardware or GPU (230) is also configured to perform operations for video quality estimation and return results of the quality estimation operations to the quality estimation service (212). In this configuration, reconstructed video content need not be transferred between the video decoder (224) and quality estimation service (212), because the reconstructed video content is already buffered at the hardware or GPU (230). Similarly, in this configuration, other video data (such as parameters derived from encoded data, statistics, or metadata about the encoded data) need not be transferred between the video decoder (224) and quality estimation service (212) to the extent the other video data is already available (or can be derived from information available) at the hardware or GPU (230). Alternatively, if a software video decoder is used, the video decoder (224) can provide reconstructed video content (and/or other video data) to the quality estimation service (212), which in turn provides the reconstructed video content (and/or other video data) to the hardware or GPU (230).

The output processor (226) is configured to perform post-processing operations on the reconstructed video content and output the post-processed content to the display processing service (214) for display. The post-processing operations can include scaling, cropping, clipping, compositing, color mapping, and/or other post-processing operations. Alternatively, the hardware/GPU (230) or display processing service (214) can perform one or more of the post-processing operations. As such, the reconstructed video content for which video quality is estimated can reflect one or more post-processing operations or be the "raw" uncompressed video content produced by the video decoder (224).

The results analyzer (228) is configured to receive the results of video quality estimation from the quality estimation service (212) and generate feedback based on analysis of the results. In particular, the results analyzer (228) is configured to perform operations as described in section II to analyze results. For example, the results analyzer (228) can filter out certain scores or aggregate certain scores. The results analyzer (228) is configured to provide the feedback to the networking service (216), which sends the feedback to the streaming service or conferencing service that provided the encoded data. Alternatively, the networking service (216) can send the feedback to a cloud service that independently estimates video quality and provides encoder control values to the streaming service or conferencing service (as described in section V). The streaming service or conferencing service can then adjust encoding as it deems appropriate.

FIG. 3 shows an example protocol (300) including operations of, and interactions between, a streaming service (or conferencing service) and modules of a client computer system (such as modules described with reference to FIG. 2). The client computer system includes an operating system service for estimating video quality.

As shown in FIG. 3, a streaming service or conferencing service provides packets of encoded data to a client computer system over a content delivery network or other network. At the client computer system, a video playback application (e.g., with a depacketizer/DEMUX module) receives the packets of encoded data and performs operations to depacketize and demultiplex the encoded data. The encoded data is provided to a video decoder, which may be separate from the video playback application or integrated into video playback application. The video decoder performs operations to decode the encoded data and reconstruct video content.

The video playback application provides video data (such as reconstructed video content, parameters derived from the encoded data, and/or metadata about the encoded data) to the quality estimation service of the operating system. The video playback application can directly provide the video data or indirectly provide the video data using hardware or a GPU shared between the video decoder and quality estimation service. The quality estimation service estimates video quality of the reconstructed video content and provides results (e.g., scores) of the video quality estimation to the video playback application. Using the received results, the video playback application can generate feedback. The video playback application provides the results (or generated feedback) to a cloud service, which can in turn provide encoder control values (based at least in part on the feedback or results) to a streaming service or conferencing service. Alternatively, the video playback application provides the results or generated feedback to the streaming service or conferencing service, which can use the results or generated feedback to determine adjustments to make in subsequent encoding.

The video playback application also performs post-processing operations (such as scaling, cropping, and color-mapping) and provides the post-processed video content as output for display. Although not shown in FIG. 3, the reconstructed video content for which video quality is estimated can reflect one or more post-processing operations instead of being the "raw" uncompressed video content produced by the video decoder.

B. Example Techniques

FIG. 4 shows an example technique (400) for interacting with an operating system service that estimates video quality. An application executing on a client computer system, as described with reference to FIG. 2 or otherwise, can perform the technique (400). For example, the application is a video playback application executing on the client computer system. Alternatively, the application is another type of application. FIG. 5 shows an example technique (500) for estimating video quality. An operating system service of an operating system of a client computer system, as described with reference to FIG. 2 or otherwise, can perform the technique (500).

To start, the application sends (410), to the operating system service, a request to register the application with the operating system service. As part of the request, the application can specify information such as the spatial resolution, frame rate, and real-time sensitivity of a given video stream, along with a process identifier for the application. The operating system service receives (510), from the application, the request to register the application with the operating system service and registers (520) the application with the operating system service. In reply to the request, the operating system service can send to the application an indicator of success and a unique token than identifies the given video stream, as described above.

The application and operating system service can communicate across an interface exposed and implemented by the operating system service. The interface can include functions that the application calls to perform various operations (e.g., register the application with the operating system service or unregister the application; signal that reconstructed video content is ready for quality estimation or request results of quality estimation; register for events relating to quality estimation or unregister for events relating to quality estimation).

After the application is registered, the application iteratively performs operations to process video content, and the operating system service iteratively performs operations to estimate video quality of reconstructed video content. For example, the application and operating system service perform operations on a frame-by-frame basis. Alternatively, the application and operating system service perform operations on some other basis (e.g., for a slice or other portion of reconstructed video content less than a frame, or for a GOP or other portion of reconstructed video content longer than a single frame).

With reference to FIG. 4, the application checks (430) whether to continue processing for another portion of reconstructed video content. If so, the application performs operations for that portion of reconstructed video content. Similarly, the operating system service checks (530) whether to continue processing for another portion of reconstructed video content. If so, the operating system service performs operations for that portion of reconstructed video content.

The application can perform various operations not shown in FIG. 4 for a portion of reconstructed video content. For example, the application receives encoded data, decodes the encoded data to produce the portion of reconstructed video content, performs post-processing operations on the portion of reconstructed video content (by itself performing the post-processing operations or managing performance of the post-processing operations by another service or application), and outputs the post-processed video content for display. In some example implementations, depending on resources available at the client computer system, the application can select between using a hardware mode (e.g., using special-purpose decoding hardware or GPU-accelerated decoding) and a software mode for decoding, as described with reference to FIG. 6.

With reference to FIG. 4, for a video frame or other portion of reconstructed video content, the application provides (440), to the operating system service, video data such as the portion of reconstructed video content (sample values), parameters derived from encoded data, and/or metadata about the encoded data. The operating system service receives (540) the video data. For example, reconstructed video content is read into a buffer accessible to the operating system service or into GPU memory that performs operations for video quality estimation. Or, as another example, the operating system service receives a pointer, handle, or other reference to memory that stores reconstructed video content and/or other video data for video quality estimation. Thus, the application can provide video data directly or indirectly (using the GPU or special-purpose decoding hardware on behalf of the application).

Reconstructed video content for which video quality is estimated can be the version of reconstructed video content before post-processing operations for clipping, cropping, compositing, scaling, or color mapping. Alternatively, reconstructed video content for which video quality is estimated can be a version after one or more of such post-processing operations.

Using the received video data, the operating system service estimates (550) video quality of the portion of reconstructed video content. For example, using the video data as input, the operating system service calculates multiple constituent quality metrics for the portion of reconstructed video content and, using a machine learning model, maps the multiple constituent quality metrics to a video quality score. The video quality score can be an overall video quality score or score for a specific cause of quality degradation. Section I describes examples of quality metrics and mapping operations. For example, the constituent quality metrics include one or more of a NIQE metric, a BLIINDS metric, a Video-BLIINDS metric, a BRISQUE metric, a DIIVINE metric, an ITU-T Rec. P.1203.1 metric, an ITU-T Rec. P.1204.3 metric, an ITU-T Rec. P.1204.5 metric, a constituent quality metric for VMAF, and a constituent quality metric for PEA265. Alternatively, the constituent quality metrics include other and/or additional quality metrics calculated without reference to original video content.

In general, when estimating video quality, the operating system service can generate metrics for multiple types of compression artifacts in the portion of reconstructed video content. For example, for each of multiple types of compression artifacts, the operating system service generates a type-specific metric. The type-specific metric indicates the likelihood of that type of compression artifact in the portion of reconstructed video content. The multiple types of compression artifacts can include blocking, ringing, banding, blurring, and/or another type of compression artifact.

Also, when estimating video quality, the operating system service can generate metrics for multiple regions of the portion of reconstructed video content. For example, for each of multiple regions of the portion of reconstructed video content, the operating system service generates a region-specific metric. The region-specific metric indicates the likelihood of compression artifacts in the region. The region-specific metric for a region can also be a type-specific metric for a type of compression artifact in the region. In this case, when estimating video quality, the operating system service can, for each of multiple types of compression artifacts in a region, generate a type-specific metric that indicates the likelihood of that type of compression artifact in the region.

Depending on implementation, the machine learning model used in quality estimation can be a convolutional neural network (as described in section I) or other type of machine learning model. The machine learning model can be trained for multiple different video content types (generic) or trained for a specific video content type.

The operating system service sends (560), to the application, results of the video quality estimation. The results can be formatted as a JSON message. Alternatively, the results are formatted in some other way. The results can include a video quality score for the portion of reconstructed video content. The video quality score can be an overall video score or score for a specific cause of quality degradation. Alternatively, the results can include, for each of multiple regions of the portion of reconstructed video content, a region-specific video quality score (overall or cause-specific) for the region. The application receives (460), from the operating system service, the results of video quality estimation for the portion of reconstructed video content.

With reference to FIG. 4, the application generates (470) feedback based at least in part on analysis of the results. For example, the analysis of the results can include filtering the results to remove certain kinds of results. Or, as another example, the analysis of the results can include aggregating (spatially and/or temporally) the results across multiple regions or portions of reconstructed video content. Section II describes examples of analysis of results of video quality estimation and explains how feedback based on the analysis can be used. The application then sends (480) the feedback to a cloud service, streaming service, or conferencing service. Alternatively, the application simply sends the results to the cloud service, streaming service, or conferencing service, without the application analyzing the results.

During ongoing processing of portions (e.g., frames) of reconstructed video content, the application and operating system service can interact in different ways, depending on implementation. For example, for a portion of reconstructed video content, the application sends, to the operating system service, a request to provide results of video quality estimation. The operating system service receives, from the application, the request and sends the results in response to the request. Or, as another example, the application sends, to the operating system service, a request to subscribe to events of an event type. The operating system service receives, from the application, the request to subscribe to events of the event type and allows the application to subscribe to the events. Subsequently, in response to firing of one of the events of the event type, the operating system service sends the results and the application receives the results.

A streaming service or conferencing service can use the feedback or results of video quality estimation to make adjustments in subsequent encoding. Alternatively, a streaming service can use the feedback or results of video quality estimation to make adjustments in re-encoding of video content. For example, when a video clip is encoded into an adaptive bitrate ("ABR") ladder with various renditions for distribution via a content delivery network, the video clip may need to be re-encoded for an ABR ladder in another geo-location. This could occur for a variety of reasons, e.g., a different content delivery network operates in the region. In this situation, it can be effective to transmit the original video clip and re-encode the video clip in the other geo-location. Feedback or results for the video clip can be used in subsequent encoding operations of the video clip to determine preferred or starting reference encoder settings.

C. Innovative Features

The following table shows some of the innovative features described herein for an operating system for estimating video quality.

| | Feature |
|---|---|
| B1 | In a client computer system, a method comprising, with an operating system service of an operating system of the client computer system: for a portion of reconstructed video content: receiving video data; estimating, using the video data, video quality of the portion of reconstructed video content; and sending, to an application executing on the client computer system, results of the estimating the video quality. |
| B2 | The method of B1, further comprising, with the operating system service: receiving, from the application, a request to register the application with the operating system service; and registering the application with the operating system service. |
| B3 | The method of B2, further comprising, with the operating system service: receiving, from the application, a request to provide the results, wherein the sending the results is performed responsive to the request to provide the results. |
| B4 | The method of B2, further comprising, with the operating system service: receiving, from the application, a request to subscribe to events of an event type, wherein the sending the results is performed responsive to firing of one of the events of the event type. |
| B5 | The method of any one of B1 to B4, wherein the estimating the video quality includes: calculating multiple constituent quality metrics for the portion of reconstructed video content; and mapping, using a machine learning model, the multiple constituent quality metrics to a video quality score. |
| B6 | The method of B5, wherein the machine learning model is a convolutional neural network. |
| B7 | The method of B5, wherein the machine learning model is trained for multiple different video content types. |
| B8 | The method of B5, wherein the machine learning model is trained for a specific video content type. |
| B9 | The method of any one of B1 to B8, wherein the video data includes: the portion of reconstructed video content, wherein the portion of reconstructed video content is sample values; parameters derived or reconstructed from encoded data; statistics calculated from the encoded data; and/or metadata about the encoded data. |
| B10 | The method of any one of B1 to B9, wherein the estimating the video quality is performed without reference to original video content. |
| B11 | The method of any one of B1 to B10, wherein the estimating the video quality includes, for each of multiple types of compression artifacts: generating a type-specific metric, the type-specific metric indicating likelihood of that type of compression artifact in the portion of reconstructed video content. |
| B12 | The method of B11, wherein the multiple types of compression artifacts include one or more of blocking, ringing, banding, and blurring. |
| B13 | The method of any one of B1 to B10, wherein the estimating the video quality includes, for each of multiple regions of the portion of reconstructed video content: generating a region-specific metric, the region-specific metric indicating likelihood of compression artifacts in the region. |
| B14 | The method of B13, wherein the region-specific metric is a type-specific metric, and wherein the estimating the video quality further includes, for each of multiple other types of compression artifacts in the region: generating another type-specific metric, the other type-specific metric indicating likelihood of that other type of compression artifact in the region. |
| B15 | The method of any one of B1 to B14, wherein the portion of reconstructed video content is a video frame. |
| B16 | The method of any one of B1 to B15, wherein the results are formatted as a Java Script Object Notation message. |
| B17 | One or more computer-readable media having stored thereon computer-executable instructions for causing a processor system, when programmed thereby, to perform operations of the method of any one of B1 to B16. |
| B18 | A client computer system comprising a processor system and memory, wherein the client computer system is configured to perform operations of the method of any one of B1 to B16. |
| C1 | In a client computer system, a method comprising, with an application executing on the client computer system: for a portion of reconstructed video content: providing, to an operating system service of an operating system of the client computer system, video data; and receiving, from the operating system service, results of estimating video quality of the portion of reconstructed video content, the results having been generated with the operating system service. |
| C2 | The method of C1, further comprising, with the application: sending, to the operating system service, a request to register the application with the operating system service. |

-continued

| | Feature |
|---|---|
| C3 | The method of C2, further comprising, with the application:<br>sending, to the operating system service, a request to provide the results,<br>wherein the results are received in response to the request to provide the results. |
| C4 | The method of C2, further comprising, with the application:<br>sending, to the operating system service, a request to subscribe to events of<br>an event type, wherein the results are received in response to firing of one of the<br>events of the event type. |
| C5 | The method of any one of C1 to C4, further comprising, with the<br>application:<br>generating feedback based at least in part on analysis of the results; and<br>sending, by the application to a cloud service, streaming service, or<br>conferencing service, the feedback. |
| C6 | The method of C5, wherein the analysis of the results includes one or more<br>of filtering the results and aggregating the results. |
| C7 | The method of any one of C1 to C4, further comprising, with the<br>application:<br>sending, by the application to a cloud service, streaming service, or<br>conferencing service, the results. |
| C8 | The method of any one of C1 to C7, wherein the results include a video<br>quality score for the portion of reconstructed video content. |
| C9 | The method of any one of C1 to C7, wherein the results include, for each of<br>multiple regions of the portion of reconstructed video content, a region-specific<br>video quality score for the region. |
| C10 | The method of any one of C1 to C9, further comprising, with the<br>application:<br>receiving encoded data;<br>decoding the encoded data to produce the portion of reconstructed video<br>content;<br>performing post-processing operations on the portion of reconstructed video<br>content; and<br>outputting the post-processed video content for display. |
| C11 | The method of C10, further comprising, with the application:<br>selecting between a hardware mode and a software mode for the decoding. |
| C12 | The method of any one of C1 to C10, wherein the video data includes:<br>the portion of reconstructed video content, wherein the portion of<br>reconstructed video content is sample values;<br>parameters derived or reconstructed from encoded data;<br>statistics calculated from the encoded data; and/or<br>metadata about the encoded data. |
| C13 | The method of any one of C1 to C12, wherein the portion of reconstructed<br>video content is a video frame. |
| C14 | The method of any one of C1 to C13, wherein the results are formatted as a<br>Java Script Object Notation message. |
| C15 | One or more computer-readable media having stored thereon computer-<br>executable instructions for causing a processor system, when programmed thereby,<br>to perform operations of the method of any one of C1 to C14. |
| C16 | A client computer system comprising a processor system and memory,<br>wherein the client computer system is configured to perform operations of the<br>method of any one of C1 to C14. |

D. Technical Effects

Applications executing on a client computer system, if they provide video quality feedback at all, typically provide video quality feedback that is inconsistent, unreliable, and collected in an intrusive way. For example, a viewer may be asked to rate video quality at a high level (such as a rating between one to five stars) after streaming finishes. Or, as another example, quality may be estimated using engagement time as a proxy, by tracking how long a viewer watches a video. Aside from being subjective and potentially bothersome to a user to collect, such feedback is neither detailed nor timely.

With video quality estimation provided as an operating system service, estimates of video quality can be collected unobtrusively, from the perspective of the user. Providing video quality estimation as an operating system service can also simplify the process of application development and maintenance, by removing the task of video quality estimation from the scope of the application.

Moreover, with video quality estimation provided as an operating system service, estimates of video quality can be determined in a consistent way for different video streams played back by a video playback application at a given client computer system, or for video streams played back by different video playback applications at a given client computer system. Quality estimates can be fine-grained. Detailed quality estimates can provide scores for different regions of a portion of reconstructed video content. Video quality can be estimated by the operating system service objectively—in a way that does not depend on different viewer preferences or lighting conditions.

Moreover, with video quality estimation provided as an operating system service, video quality estimation is resilient to application crashes. If an application crashes after providing video data to the operating system service but before receiving the results of video quality estimation, the application can retrieve the results after the application has recovered operation. Moreover, the operating system service can track which applications request video quality estimation (and corresponding use of computer resources such as CPU resources, GPU resources, or neural processing unit ("NPU") resources) and verify that the applications are permitted to use the resources.

With estimates of video quality that have been collected in a consistent and reliable manner, a video playback application can use the estimates to provide feedback to a streaming service or conferencing service, which can adjust video encoding in ways that improve subsequent video quality and improve the overall user experience. For example, during streaming, a video playback application can provide results of quality estimation (or feedback based on the results of quality estimation) to a streaming service or conferencing service, which the streaming/conferencing service can use to adjust encoding and improve overall quality during the same streaming session. Or, after streaming, a video playback application can provide results of quality estimation (or feedback based on the results of quality estimation) to a streaming service or conferencing service, which the streaming/conferencing service can use to adjust encoding and improve overall quality in subsequent streaming sessions.

Iv. Selecting Between Video Decoder Implementations when Estimating Video Quality In some example implementations, operations performed to estimate video quality are performed using a GPU or special-purpose hardware (such as an NPU with a video codec block). In such implementations, if video decoding operations can be performed using the same GPU or special-purpose hardware, reconstructed video content (and/or other video data) can be provided for quality estimation in a simpler, more streamlined way.

FIG. 6 shows an example technique (600) for selecting between video decoder implementations when estimating video quality. An application executing on a client computer system, as described with reference to FIG. 2 or otherwise, can perform the technique (600). Alternatively, a cloud service in a server computer system, as described with reference to FIG. 7 or otherwise, can perform the technique (600).

To start, the system checks (610) whether to use a hardware or GPU-accelerated video decoder or a software video decoder. Typically, if a hardware or GPU-accelerated video decoder is available, the system uses that hardware or GPU-accelerated video decoder. Using a hardware or GPU-accelerated video decoder can help reduce latency and achieve higher throughput.

If a hardware or GPU-accelerated video decoder is used, the system decodes (620) encoded data for reconstructed video content using the hardware or GPU-accelerated video decoder. The system then forwards (622), to a component that performs operations for video quality estimation, a handle to a buffer that stores the reconstructed video content. Other video data (such as parameters derived from encoded data or metadata about the encoded data) can similarly be provided to the component that performs the operations for video quality estimation. With the video data, the system estimates (640) the video quality of the reconstructed video content (e.g., using a machine learning model). For the quality estimation, the system uses the same GPU or hardware. The quality estimation can be part of the technique described with reference to FIG. 5 (at stage 550) or FIG. 10 (at stage 1050).

On the other hand, if a software decoder is used the system decodes (630) encoded data for reconstructed video content using the software video decoder. The system then transfers (632) the reconstructed video content to a buffer accessible to the GPU or hardware used for video quality estimation. Other video data (such as parameters derived from encoded data or metadata about the encoded data) can similarly be provided. Performing operations with the GPU or hardware, the system estimates (640) the video quality of the reconstructed video content (e.g., using a machine learning model). The quality estimation can be part of the technique described with reference to FIG. 5 (at stage 550) or FIG. 10 (at stage 1050).

The system checks (650) whether to continue operations. If so, the system continues decoding with the software video decoder (if that option was selected at stage 610) or continues decoding with the hardware or GPU-accelerated video decoder (if that option was selected at stage 610). In this way, the system iteratively performs operations to process video content. For example, the system performs operations on a frame-by-frame basis. Alternatively, the system performs operations on some other basis (e.g., for a slice or other portion of reconstructed video content less than a frame, or for a GOP or other portion of reconstructed video content longer than a single frame).

V. Example Cloud Services for Estimating Video Quality

This section describes various features of example cloud services for estimating video quality. With video quality estimation provided as a cloud service, estimates of video quality can be collected in a way that does not rely on feedback from any video playback application or user. Instead, quality estimation can be performed as part of a contained, inline loop at one or more server computer systems. As part of the loop, network effects such as dropping, reordering, delay, or corruption of packets can be simulated. Moreover, with video quality estimation provided as a cloud service, estimates of video quality can be determined in a consistent way for different video streams, different networking scenarios, different types of computer systems, and different video playback applications. Quality estimates can be fine-grained, with scores provided for different regions of a portion of reconstructed video content. The cloud service can use the video quality estimates to provide encoder control values or other feedback to a streaming service or conferencing service, which can adjust video encoding in ways that improve subsequent video quality and improve the overall user experience.

A. Example Architectures

FIG. 7 shows an example architecture (700) for video quality estimation using a cloud service at a server computer system. The example architecture (700) includes a cloud service (710) and a streaming (or conferencing) service (730). The cloud service (710) includes a network simulator (711), a depacketizer/DEMUX (712), a video decoder (713), a quality estimator (714), a quality/artifact analyzer (715), and a database (716). The streaming (or conferencing) service (730) includes a video source (731), a video encoder (732), and a packetizer/multiplexer ("MUX") (733).

In the cloud service (710), the network simulator (711) is configured to receive packets of encoded data from the streaming (or conferencing) service (730), simulate effects of network delivery of the packets to client computer systems under different conditions, and deliver the modified series of packets of encoded data to the depacketizer/DEMUX (712). Thus, even if the cloud service (710) and streaming (or conferencing) service (730) are implemented using the same server computer system or two different server computer systems connected using a reliable, highspeed network connection, the network simulator (711) can simulate the effects of packet drops, packet delays or reordering, or packet corruptions (e.g., due to bit flip errors). For example, the network simulator (711) can drop a packet to simulate loss of the packet at a network router or corruption of the packet that cannot be fixed with error correction. Or, as another example, the network simulator (711) can delay a packet or reorder two or more packets to simulate differential latencies for different paths through a network. In some example implementations, the network simulator (711) is configured to simulate network effects according to high-level settings that can be controlled at the cloud service (710). According to the settings, the network simulator (711) can simulate different rates of packet loss (e.g., from no loss to very high loss), different patterns of packet loss (e.g., consistent or bursty), and introduction of different amounts of delay or reordering. Alternatively, the network simulator (711) can be configured to simulate network effects based on feedback about actual network conditions from a client computer system or multiple client computer systems.

The depacketizer/DEMUX (712) is configured to receive and process a series of packets of encoded data in containers (organized according to a container format such as ISO/IEC 14496-12, ASF, WebM, or another container format). The depacketizer/DEMUX (712) is configured to remove encoded data for video content from the containers. Depending on implementation, the depacketizer/DEMUX (712) can de-packetize encoded data that has been aggregated for transmission as a media stream, in which case the depacketizer/DEMUX (712) parses syntax elements added as part of the syntax of the media transmission stream. Or, more generally, the depacketizer/DEMUX (712) can implement one or more media system demultiplexing protocols or transport protocols, in which case the depacketizer/DEMUX (712) parses syntax elements added as part of the syntax of the protocol(s). The depacketizer/DEMUX (712) can be implemented as an operating system module, as part of an application library, as part of a standalone application or using special-purpose hardware.

The video decoder (713) is configured to receive encoded data in an elementary bitstream (compliant with a standardized codec format or proprietary codec format) and decode the encoded data to produce reconstructed video content. The video decoder (713) can be a general-purpose decoding tool capable of operating in any of multiple decoding modes such as a low-latency decoding mode for live streaming or real-time communication and a regular decoding mode for video playback from a file or stream, or it can be a special-purpose decoding tool adapted for one such decoding mode. The video decoder (713) can be implemented using a software decoder, using special-purpose hardware, or using a GPU. Generally, the video decoder (713) includes multiple decoding modules that perform decoding tasks such as entropy decoding, inverse quantization, inverse frequency transforms and prediction. The exact operations performed by the video decoder (713) can vary depending on codec format.

The quality estimator (714) is configured to estimate video quality of reconstructed video content and to produce results of the video quality estimation. As input, the quality estimator (714) can accept various types of video data, such as reconstructed video content (sample values), parameters derived or reconstructed from the encoded data (such as quantization parameters, motion vector values, transform coefficient values, mode decisions), statistics calculated from the encoded data, or metadata about the encoded data (such as spatial resolution, temporal resolution, bitrate, or codec). The results can be, for example, a video quality score or multiple scores for a portion of reconstructed video content or, for each of multiple regions of the portion of reconstructed video content, a region-specific video quality score or scores for the region. In particular, the quality estimator (714) is configured to perform operations as described in section I to estimate video quality. Unlike the quality estimation service (212) in the operating system (210) of FIG. 2, the quality estimator (714) in the cloud service (710) estimates quality for reconstructed video content that has not been delivered over a network to a specific client computer system or played back by a specific video playback application. Due to differences between simulated network effects (if any) and actual network effects (if any), the reconstructed video content may be different than the video played back at actual client computer systems. On the other hand, the quality estimator (714) and quality/artifact analyzer (715) do not depend on feedback from any client computer system.

Although not shown in FIG. 7, the video decoder (713) and quality estimator (714) can use special-purpose hardware or a GPU for video decoding and quality estimation, respectively, as described with reference to FIG. 2. In this case, reconstructed video content (and/or other video data) can be transferred more efficiently between the video decoder (713) and the quality estimator (714).

The quality/artifact analyzer (715) is configured to generate encoder control values based on analysis of the results of video quality estimation. In particular, the quality/artifact analyzer (715) is configured to perform operations as described in section II to analyze results and generate encoder control values. For example, the quality/artifact analyzer (715) can filter out certain scores or aggregate certain scores. In generating encoder control values, the quality/artifact analyzer can react quickly, react slowly, or ignore the results of video quality estimation. Based on trends, the quality/artifact analyzer (715) can take different action depending on whether a problem is expected to continue (e.g., due to a complexity bump in the content) or expected to end (e.g., complexity of content is decreasing) or not expected at all. The encoder control values can indicate changes to encoder settings of the video encoder (732).

In FIG. 7, the cloud service (710) does not get feedback from a client computer system. Alternatively, the quality/artifact analyzer (715) can get feedback and/or results of quality estimation from an application or other module of a client computer system. The quality/artifact analyzer (715) can use the feedback and/or results when generating encoder control values.

The database (716) is configured to store encoder settings, heuristic rules, and/or other information that can be used by the quality/artifact analyzer (715) when generating encoder control values. Examples of encoder settings and heuristic rules are described in section II.

The streaming (or conferencing) service (730) registers with the cloud service (710). For example, the streaming (or conferencing) service (730) sends a request to register to the cloud service (710). As part of the request, the streaming (or conferencing) service (730) can specify parameters describing a given video stream, such as spatial resolution, frame rate, and real-time sensitivity for quality estimation (e.g., very sensitive to delay, somewhat sensitive to delay, or not sensitive to delay), as well as a process identifier for the streaming (or conferencing) service (730). The cloud service (710) can respond with an indicator of whether registration has succeeded or failed. If registration succeeds, the cloud service (710) can further provide an indication of whether the cloud service (710) can comply with the requested real-time sensitivity for quality estimation. Also, if registration succeeds, the cloud service (710) can provide a unique token such as a unique token number or other UUID to the streaming (or conferencing) service (730). The unique token is essentially a stream identifier associated with the given video stream for purposes of video quality estimation. The streaming (or conferencing) service (730) can use the unique token to request and/or identify results of video quality estimation for the given video stream. The indicators provided by the cloud service (710) can be provided as part of a JSON message or other message. In the message, a single value can provide multiple indicators (e.g., an indicator of success, an indicator that the requested real-time sensitivity is acceptable, and a unique token for a given video stream).

The streaming (or conferencing) service (730) can request and receive video quality estimates for a single video stream or multiple video streams. After registration, different unique tokens for different streams can be used by the streaming (or conferencing) service (730) and the cloud service (710) to designate results of video quality estimation for the different streams over time.

The video source (731) is configured to provide video content for the streaming (or conferencing) service. The video source (731) typically produces a sequence of video frames. The video source (731) can be a storage device that provides video content. Alternatively, the video source (731) can be a camera input that accepts video input in analog or digital form from a video camera, which captures natural video. Or, as another alternative, the video source (731) can be a screen capture module (e.g., a driver of an operating system, or software that interfaces with an operating system) that provides screen capture content as input. Or, as another alternative, the video source (731) can be a graphics engine that provides texture data for graphics in a computer-represented environment. Or, as another alternative, the video source (731) can be a video card, TV tuner card, or other video input that accepts input video in analog or digital form (e.g., from a cable input, High-Definition Multimedia Interface ("HDMI") input or other input).

The video encoder (732) is configured to receive video content and encode the video content to produce encoded data in an elementary bitstream compliant with a standardized codec format or proprietary codec format. The video encoder (732) can be a general-purpose encoding tool capable of operating in any of multiple encoding modes such as a low-latency encoding mode for live streaming or real-time communication, and a regular encoding mode for video playback from a file or stream, or it can be a special-purpose encoding tool adapted for one such encoding mode. The video encoder (732) can be implemented as an operating system module, as part of an application library, as a part of a standalone application or using special-purpose hardware. Generally, the video encoder (732) includes multiple encoding modules that perform encoding tasks such as prediction, frequency transforms, quantization, and entropy coding. The exact operations performed by the video encoder (732) vary depending on codec format. In any case, the video encoder (732) is configured to perform encoding operations according to encoder settings, which can be adjusted based on encoder control values that the streaming (or conferencing) service (730) receives from the cloud service (710). Section II describes some examples of adjustments to encoder settings based on encoder control values.

The packetizer/MUX (733) is configured to receive encoded data in an elementary bitstream and organize the encoded data in containers according to a container format such as ISO/IEC 14496-12, ASF, WebM, or another container format. The packetizer/MUX (733) can packetize encoded data in containers for transmission as a media stream, in which case the packetizer/MUX (733) adds syntax elements as part of the syntax of the media transmission stream. Or, more generally, the packetizer/MUX (733) can implement one or more media system multiplexing protocols or transport protocols, in which case the packetizer/MUX (733) adds syntax elements as part of the syntax of the protocol(s). The packetizer/MUX (733) can be implemented as an operating system module, as part of an application library, as part of a standalone application or using special-purpose hardware.

The streaming (or conferencing) service (730) is configured to buffer packets of encoded data in memory and to output packets of encoded data over a content delivery network or other network. Alternatively, the encoded data can be stored in storage for later packetization and output. The streaming (or conferencing) service (730) is also configured to output packets of encoded data to the cloud service for estimation of video quality.

FIG. 8 shows an example protocol (800) including operations of, and interactions between, modules of a cloud service (such as the cloud service (710) of FIG. 7) for estimating video quality. FIG. 8 depicts modules of a server computer system that implements a cloud service for video quality estimation, including a network simulator, a depacketizer/DEMUX, a video decoder, a quality estimator, a quality analyzer, and a database.

As shown in FIG. 8, the network simulator simulates network effects on packets of encoded data, which have been received from a streaming service or conferencing service, and provides remaining packets to the depacketizer/DEMUX. The depacketizer/DEMUX depacketizes and demultiplexes encoded data from the packets and provides the encoded data to the video decoder. The video decoder decodes the encoded data to reconstruct video content and provides the reconstructed video content (and/or other video data) to the quality estimator. The video decoder can directly provide the video data or indirectly provide it using shared hardware or a shared GPU. Using the video data, the quality estimator estimates video quality of the reconstructed video content and provides results (e.g., scores) of the video quality estimation to the quality analyzer. The quality analyzer retrieves encoder settings and heuristic rules from the database. Using the retrieved encoder settings, the retrieved heuristic rules, and the received results, the quality analyzer generates encoder control values, which the quality analyzer provides to a video encoder of the streaming service or conferencing service.

B. Example Techniques

FIG. 9 shows an example technique (900) for interacting with a cloud service that estimates video quality. A streaming service or conferencing service that includes a video encoder, as described with reference to FIG. 7 or otherwise, can perform the technique (900). FIG. 10 shows an example technique (1000) for estimating video quality. A cloud service in a server computer system, as described with reference to FIG. 7 or otherwise, can perform the technique (1000).

To start, the streaming/conferencing service sends (910), to the cloud service, a request to register the streaming/conferencing service with the cloud service. As part of the request, the streaming/conferencing service can specify information such as the spatial resolution, frame rate, and real-time sensitivity of a given video stream, along with a process identifier for the streaming/conferencing service. The cloud service receives (1010), from the streaming/conferencing service, the request to register the streaming/conferencing service with the cloud service and registers (1020) the streaming/conferencing service with the cloud service. In reply to the request, the cloud service can send to the streaming/conferencing service an indicator of success and a unique token than identifies the given video stream, as described above.

The streaming/conferencing service and cloud service can communicate across an interface exposed and implemented by the cloud service. The interface can include functions that the streaming/conferencing service calls to perform various operations (e.g., register the streaming/conferencing service with the cloud service or unregister the streaming/conferencing service; request results of quality estimation; register for events relating to quality estimation or unregister for events relating to quality estimation). Alternatively, the streaming/conferencing service and cloud service can communicate across an interface exposed and implemented by the streaming/conferencing service, with the interface including functions that the cloud service calls to perform various operations.

After the streaming/conferencing service is registered, the streaming/conferencing service iteratively performs operations to process reconstructed video content, and the cloud service iteratively performs operations to estimate video quality of reconstructed video content. For example, the streaming/conferencing service and cloud service perform operations on a frame-by-frame basis. Alternatively, the streaming/conferencing service and cloud service perform operations on some other basis (e.g., for a slice or other portion of reconstructed video content less than a frame, or for a GOP or other portion of reconstructed video content longer than a single frame).

With reference to FIG. 9, the streaming/conferencing service checks (930) whether to continue processing for another portion of reconstructed video content. If so, the streaming/conferencing service performs operations for that portion of reconstructed video content. Similarly, the cloud service checks (1030) whether to continue processing for another portion of reconstructed video content. If so, the cloud service performs operations for that portion of reconstructed video content.

The cloud service can perform various operations not shown in FIG. 10 for a portion of reconstructed video content. For example, the cloud service receives packets of encoded data and modifies the packets of encoded data to simulate network effects. To simulate network effects, the cloud service can modify the packets by dropping one or more of the packets, delaying one or more of the packets, reordering two or more of the packets, and/or introducing bit flip errors in one or more of the packets. The cloud service depacketizes and demultiplexes the modified packets and decodes the encoded data from the modified packets to produce the portion of reconstructed video content. In some example implementations, depending on resources available at the server computer system, the cloud service can select between using a hardware mode (e.g., using special-purpose decoding hardware or GPU-accelerated decoding) and a software mode for the decoding, as described with reference to FIG. 6.

With reference to FIG. 10, for a video frame or other portion of reconstructed video content, the cloud service receives (1040) video data such as the portion of reconstructed video content (sample values), parameters derived from encoded data, and/or metadata about the encoded data. For example, reconstructed video content is read into a buffer accessible to the cloud service or into GPU memory that performs operations for video quality estimation. Or, as another example, the cloud service receives a pointer, handle, or other reference to memory that stores reconstructed video content and/or other video data for video quality estimation. Thus, video data can be received directly or indirectly (using the GPU or special-purpose decoding hardware on behalf of the cloud service). Reconstructed video content for which video quality is estimated is the version of reconstructed video content before post-processing operations for clipping, cropping, compositing, scaling, or color mapping.

The cloud service estimates (1050) video quality of the portion of reconstructed video content. For example, using the video data as input, the cloud service calculates multiple constituent quality metrics for the portion of reconstructed video content and, using a machine learning model, maps the multiple constituent quality metrics to a video quality score. The video quality score can be an overall video quality score or score for a specific cause of quality degradation. Section I describes examples of quality metrics and mapping operations. For example, the constituent quality metrics include one or more of a NIQE metric, a BLIINDS metric, a Video-BLIINDS metric, a BRISQUE metric, a DIIVINE metric, an ITU-T Rec. P.1203.1 metric, an ITU-T Rec. P.1204.3 metric, an ITU-T Rec. P.1204.5 metric, a constituent quality metric for VMAF, and a constituent quality metric for PEA265. Alternatively, the constituent quality metrics include other and/or additional quality metrics calculated without reference to original video content.

In general, when estimating video quality, the cloud service can generate metrics for multiple types of compression artifacts in the portion of reconstructed video content. For example, for each of multiple types of compression artifacts, the cloud service generates a type-specific metric. The type-specific metric indicates the likelihood of that type of compression artifact in the portion of reconstructed video content. The multiple types of compression artifacts can include blocking, ringing, banding, blurring, and/or another type of compression artifact.

Also, when estimating video quality, the cloud service can generate metrics for multiple regions of the portion of reconstructed video content. For example, for each of multiple regions of the portion of reconstructed video content, the cloud service generates a region-specific metric. The region-specific metric indicates the likelihood of compression artifacts in the region. The region-specific metric for a region can also be a type-specific metric for a type of compression artifact in the region. In this case, when estimating video quality, the cloud service can, for each of multiple types of compression artifacts in a region, generate a type-specific metric that indicates the likelihood of that type of compression artifact in the region.

Depending on implementation, the machine learning model used in quality estimation can be a convolutional neural network (as described in section I) or other type of machine learning model. The machine learning model can be trained for multiple different video content types (generic) or trained for a specific video content type.

The cloud service generates (1060) encoder control values based at least in part on analysis of results of the video quality estimation. The results can include a video quality score or multiple scores for the portion of reconstructed video content. The video quality score can be an overall video score or score for a specific cause of quality degradation. Alternatively, the results can include, for each of multiple regions of the portion of reconstructed video content, a region-specific video quality score (overall or cause-specific) for the region. The analysis of the results can include filtering the results to remove certain kinds of results. Or, as another example, the analysis of the results can include aggregating (spatially and/or temporally) the results across multiple regions or portions of reconstructed video content. Section II describes examples of analysis of results of video quality estimation and explains how feedback based on the analysis can be used.

The cloud service can use additional information when generating the encoder control values. For example, the cloud service can receive, from an application executing on a client computer system, results of video quality estimation for reconstructed video content at the client computer system or feedback based on such results, then consider the results or feedback when generating encoder control values. As another example, the cloud service can retrieve, from a database, one or more encoder settings and consider the encoder setting(s) when generating the encoder control values. As another example, the cloud service can retrieve, from the database, one or more heuristic rules and consider the heuristic rule(s) when generating the encoder control values. Examples of encoder settings and heuristic rules are described in Section II.

The encoder control values can include frame rate (temporal resolution), spatial resolution, overall bit rate, intra frame distance, frame type, and/or quantization parameters. The quantization parameters can include different quantization parameters for different regions (such as slices, macroblocks, or coding tree units for spatially adaptive quantization) and/or different quantization parameters for different color components (luma, chroma). Alternatively, the encoder control values can include other and/or additional types of encoder control values.

The cloud service sends (1070) the encoder control values to the streaming/conferencing service. The streaming/conferencing service receives (970) the encoder control values from the cloud service. The streaming/conferencing service adjusts (980) one or more encoder settings based at least in part on the encoder control values and encodes (990) video content according to the adjusted encoder setting(s). Alternatively, a streaming service can use the encoder control values to make adjustments in re-encoding of video content, as described with reference to FIGS. 4 and 5.

During ongoing processing of portions (e.g., frames) of video content, the streaming/conferencing service and cloud service can interact in different ways, depending on implementation. For example, the streaming/conferencing service sends, to the cloud service, a request to provide encoder control values resulting from video quality estimation. The cloud service receives, from the streaming/conferencing service, the request and sends the encoder control values in response to the request. Or, as another example, the streaming/conferencing service sends, to the cloud service, a request to subscribe to events of an event type. The cloud service receives, from the streaming/conferencing service, the request and allows the streaming/conferencing service to subscribe to the events. Subsequently, in response to firing of one of the events of the event type, the cloud service sends the encoder control values and the streaming/conferencing service receives the encoder control values.

C. Innovative Features

The following table shows some of the innovative features described herein for a cloud service for estimating video quality.

| D1 | In a server computer system, a method comprising, with a cloud service of the server computer system: for a portion of reconstructed video content: receiving video data; estimating, using the video data, video quality of the portion of reconstructed video content; generating encoder control values based at least in part on analysis of results of the estimating the video quality; and sending, to a streaming or conferencing service, the encoder control values. |
|----|----|
| D2 | The method of D1, further comprising, with the cloud service: receiving, from the streaming or conferencing service, a request to register the streaming or conferencing service with the cloud service; and registering the streaming or conferencing service with the cloud service. |
| D3 | The method of D2, further comprising, with the cloud service: receiving, from the streaming or conferencing service, a request to provide the encoder control values, wherein the sending the encoder control values is performed responsive to the request to provide the encoder control values. |
| D4 | The method of D2, further comprising, with the cloud service: receiving, from the streaming or conferencing service, a request to subscribe to events of an event type, wherein the sending the encoder control values is performed responsive to firing of one of the events of the event type. |
| D5 | The method of any one of D1 to D4, wherein the estimating the video quality includes: calculating multiple constituent quality metrics for the portion of reconstructed video content; and mapping, using a machine learning model, the multiple constituent quality metrics to a video quality score. |
| D6 | The method of D5, wherein the machine learning model is a convolutional neural network. |
| D7 | The method of D5, wherein the machine learning model is trained for multiple different video content types. |
| D8 | The method of D5, wherein the machine learning model is trained for a specific video content type. |

D9    The method of any one of D1 to D8, wherein the video data includes:
the portion of reconstructed video content, wherein the portion of
reconstructed video content is sample values;
parameters derived or reconstructed from encoded data;
statistics calculated from the encoded data; and/or
metadata about the encoded data.
D10   The method of any one of D1 to D9, wherein the estimating the video
quality is performed without reference to original video content.
D11   The method of any one of D1 to D10, wherein the estimating the video
quality includes, for each of multiple types of compression artifacts:
generating a type-specific metric, the type-specific metric indicating
likelihood of that type of compression artifact in the portion of reconstructed video
content.
D12   The method of D11, wherein the multiple types of compression artifacts
include one or more of blocking, ringing, banding, and blurring.
D13   The method of any one of D1 to D10, wherein the estimating the video
quality includes, for each of multiple regions of the portion of reconstructed video
content:
generating a region-specific metric, the region-specific metric indicating
likelihood of compression artifacts in the region.
D14   The method of D13, wherein the region-specific metric is a type-specific
metric, and wherein the estimating the video quality further includes, for each of
multiple other types of compression artifacts in the region:
generating another type-specific metric, the other type-specific metric
indicating likelihood of that other type of compression artifact in the region.
D15   The method of any one of D1 to D14, wherein the portion of reconstructed
video content is a video frame.
D16   The method of any one of D1 to D15, wherein the analysis of the results
includes one or more of filtering the results and aggregating the results.
D17   The method of any one of D1 to D16, further comprising, with the cloud
service:
receiving packets of encoded data;
modifying the packets of the encoded data to simulate network effects;
depacketizing and demultiplexing the modified packets; and
decoding encoded data from the modified packets to produce the portion of
reconstructed video content.
D18   The method of D17, wherein the modifying the packets includes dropping,
delaying, reordering, and/or introducing bit flip errors in one or more of the
packets.
D19   The method of D17, further comprising, with the cloud service:
selecting between a hardware mode and a software mode for the decoding.
D20   The method of any one of D1 to D19, further comprising, with the cloud
service:
receiving, from an application executing on a client computer system,
results of estimating video quality at the client computer system or feedback based
on the results of estimating video quality at the client computer system.
D21   The method of any one of D1 to D20, further comprising, with the cloud
service:
retrieving, from a database, one or more encoder settings, wherein the
generating the encoder control values is also based at least in part on the one or
more encoder settings.
D22   The method of any one of D1 to D20, further comprising, with the cloud
service:
retrieving, from a database, one or more heuristic rules, wherein the
generating the encoder control values is also based at least in part on the one or
more heuristic rules.
D23   The method of any one of D1 to D22, wherein the encoder control values
include one or more of frame rate, spatial resolution, overall bit rate, intra frame
distance, frame type, and quantization parameters.
D24   The method of any one of D1 to D22, wherein the encoder control values
include quantization parameters for different regions.
D25   One or more computer-readable media having stored thereon computer-
executable instructions for causing a processor system, when programmed thereby,
to perform operations of the method of any one of D1 to D24.
D26   A server computer system comprising a processor system and memory,
wherein the server computer system is configured to perform operations of the
method of any one of D1 to D24.
E1    In a server computer system, a method comprising, with a streaming or
conferencing service of the server computer system:
receiving, from a cloud service, encoder control values that have been
generated based at least in part on analysis of results of estimating video quality by
the cloud service;
adjusting encoder settings based at least in part on the encoder control
values; and
encoding video content according to the adjusted encoder settings.
E2    The method of E1, further comprising, with the streaming or conferencing
service:
sending, to the cloud service, a request to register the streaming or
conferencing service with the cloud service.

| | |
|---|---|
| E3 | The method of E2, further comprising, with the streaming or conferencing service: sending, to the cloud service, a request to provide the encoder control values, wherein the encoder control values are received in response to the request to provide the encoder control values. |
| E4 | The method of E2, further comprising, with the streaming or conferencing service: sending, to the cloud service, a request to subscribe to events of an event type, wherein the encoder control values are received in response to firing of one of the events of the event type. |
| E5 | The method of any one of E1 to E4, wherein the encoder control values include one or more of frame rate, spatial resolution, overall bit rate, intra frame distance, frame type, and quantization parameters. |
| E6 | The method of any one of E1 to E4, wherein the encoder control values include quantization parameters for different regions. |
| E7 | One or more computer-readable media having stored thereon computer-executable instructions for causing a processor system, when programmed thereby, to perform operations of the method of any one of E1 to E6. |
| E8 | A server computer system comprising a processor system and memory, wherein the server computer system is configured to perform operations of the method of any one of E1 to E6. |

D. Technical Effects

As noted above, applications executing on a client computer system, if they provide video quality feedback at all, typically provide video quality feedback that is inconsistent, unreliable, and collected in an intrusive way. Aside from being subjective and potentially bothersome to a user to collect, such feedback is neither detailed nor timely.

With video quality estimation provided as a cloud service, estimates of video quality can be collected unobtrusively, without relying on feedback from any video playback application or user. Instead, estimation of video quality can be performed as part of a contained, inline loop at a server computer system or group of server computer systems (without any client computer system providing feedback in the loop). As part of the contained, inline loop, network effects such as dropping, reordering, delay, or corruption of packets can be simulated. Providing video quality estimation as a cloud service can also simplify the process of application development and maintenance, by removing the task of video quality estimation from the scope of the application. Similarly, providing video quality estimation as a cloud service can simplify the process of development and maintenance of a streaming service or conferencing service, by removing the task of video quality estimation from the scope of the streaming service or conferencing service.

Moreover, with video quality estimation provided as a cloud service, estimates of video quality can be determined in a consistent way for different video streams played back by a video playback application at a given client computer system, for video streams played back by different video playback applications at a given client computer system, or for video streams played back at different client computer systems. Thus, quality estimates can be determined in a consistent way for different video streams, different networking scenarios, different types of computer systems, and different video playback applications. Quality estimates can be fine-grained. Detailed quality estimates can provide scores for different regions of a portion of reconstructed video content. Video quality can be estimated by the cloud service in a way that does not depend on different viewer preferences or lighting conditions.

With estimates of video quality that have been collected in a consistent and reliable manner, the cloud service can use the estimates to provide feedback to a streaming service or conferencing service, which can adjust video encoding in ways that improve subsequent video quality and improve the overall user experience. For example, during streaming, a cloud service can provide feedback (based on quality estimates) to a streaming or conferencing service, which the streaming or conferencing service can use to adjust encoding and improve overall quality during the same streaming session. Or, after streaming, a cloud service can provide feedback (based on quality estimates) to a streaming or conferencing service, which the streaming or conferencing service can use to adjust encoding and improve overall quality in subsequent streaming sessions.

VI. Example Computer Systems

FIG. 11 illustrates a generalized example of a suitable computer system (1100) in which several of the described innovations may be implemented. The innovations described herein relate to video quality estimation. The computer system (1100) is not intended to suggest any limitation as to scope of use or functionality, as the innovations may be implemented in diverse computer systems, including special-purpose computer systems.

With reference to FIG. 11, the computer system (1100) includes one or more processing cores (1110 . . . 111x) and local memory (1118) of a central processing unit ("CPU") or multiple CPUs. The processing core(s) (1110 . . . 111x) are, for example, processing cores on a single chip, and execute computer-executable instructions. The number of processing core(s) (1110 . . . 111x) depends on implementation and can be, for example, 4 or 8. The local memory (1118) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (1110 . . . 111x). Alternatively, the processing cores (1110 . . . 111x) can be part of a system-on-a-chip ("SoC"), application-specific integrated circuit ("ASIC"), or other integrated circuit.

The local memory (1118) can store software (1180) implementing aspects of the innovations for video quality estimation, for operations performed by the respective processing core(s) (1110 . . . 111x), in the form of computer-executable instructions. In FIG. 11, the local memory (1118)

is on-chip memory such as one or more caches, for which access operations, transfer operations, etc. with the processing core(s) (1110 . . . 111*x*) are fast.

The computer system (1100) also includes processing cores (1130 . . . 113*x*) and local memory (1138) of a graphics processing unit ("GPU") or multiple GPUs. The number of processing cores (1130 . . . 113*x*) of the GPU depends on implementation. The processing cores (1130 . . . 113*x*) are, for example, part of single-instruction, multiple data ("SIMD") units of the GPU. The SIMD width n, which depends on implementation, indicates the number of elements (sometimes called lanes) of a SIMD unit. The GPU memory (1138) may be volatile memory (e.g., registers, cache, RAM), non-volatile memory (e.g., ROM, EEPROM, flash memory), or some combination of the two, accessible by the respective processing cores (1130 . . . 113*x*). The GPU memory (1138) can store software (1180) implementing aspects of the innovations for video quality estimation, for operations performed by the respective processing cores (1130 . . . 113*x*), in the form of computer-executable instructions such as shader code.

The computer system (1100) includes main memory (1120), which may be volatile memory (e.g., RAM), non-volatile memory (e.g., ROM, EEPROM, flash memory), or some combination of the two, accessible by the processing core(s) (1110 . . . 111*x*, 1130 . . . 113*x*). The main memory (1120) stores software (1180) implementing aspects of the innovations for video quality estimation, in the form of computer-executable instructions. In FIG. 11, the main memory (1120) is off-chip memory, for which access operations, transfer operations, etc. with the processing cores (1110 . . . 111*x*, 1130 . . . 113*x*) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processor system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (1100) includes one or more network interface devices (1140). The network interface device(s) (1140) enable communication over a network to another computing entity (e.g., server, other computer system). The network interface device(s) (1140) can support wired connections and/or wireless connections, for a wide-area network, local-area network, personal-area network, or other network. For example, the network interface device(s) can include one or more Wi-Fi® transceivers, an Ethernet® port, a cellular transceiver and/or another type of network interface device, along with associated drivers, software, etc. The network interface device(s) (1140) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (1100) optionally includes a motion sensor/tracker input (1142) for a motion sensor/tracker, which can track the movements of a user and objects around the user. For example, the motion sensor/tracker allows a user (e.g., player of a game) to interact with the computer system (1100) through a natural user interface using gestures and spoken commands. The motion sensor/tracker can incorporate gesture recognition, facial recognition and/or voice recognition.

The computer system (1100) optionally includes a game controller input (1144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (1100) optionally includes a media player (1146) and video source (1148). The media player (1146) can play DVDs, Blu-ray™ discs, other disc media and/or other formats of media. The video source (1148) can be a camera input that accepts video input in analog or digital form from a video camera, which captures natural video. Alternatively, the video source (1148) can be a screen capture module (e.g., a driver of an operating system, or software that interfaces with an operating system) that provides screen capture content as input. Or, as another alternative, the video source (1148) can be a graphics engine that provides texture data for graphics in a computer-represented environment. Or, as another alterative, the video source (1148) can be a video card, TV tuner card, or other video input that accepts input video in analog or digital form (e.g., from a cable input, High-Definition Multimedia Interface ("HDMI") input or other input).

An optional audio source (1150) accepts audio input in analog or digital form from a microphone, which captures audio, or other audio input.

The computer system (1100) optionally includes a video output (1160), which provides video output to a display device. The video output (1160) can be an HDMI output or other type of output. An optional audio output (1160) provides audio output to one or more speakers.

The storage (1170) may be removable or non-removable, and includes magnetic media (such as magnetic disks, magnetic tapes or cassettes), optical disk media and/or any other media which can be used to store information, and which can be accessed within the computer system (1100). The storage (1170) stores instructions for the software (1180) implementing aspects of the innovations for video quality estimation.

The computer system (1100) may have additional features. For example, the computer system (1100) includes one or more other input devices and/or one or more other output devices. The other input device(s) may be a touch input device such as a keyboard, mouse, pen, or trackball, a scanning device, or another device that provides input to the computer system (1100). The other output device(s) may be a printer, CD-writer, or another device that provides output from the computer system (1100).

An interconnection mechanism (not shown) such as a bus, controller, or network interconnects the components of the computer system (1100). Typically, operating system software (not shown) provides an operating environment for other software executing in the computer system (1100), and coordinates activities of the components of the computer system (1100).

The computer system (1100) of FIG. 11 is a physical computer system. A virtual machine can include components organized as shown in FIG. 11.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electro-magnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and a computer system can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," "including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and a computer system can include any combination of special-purpose hardware and/or hardware with software implementing the functionality described herein.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and they may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

As used herein, the term "based on" or "based at least in part on" indicates a dependence. A value or output X that is "based on" (or "based at least in part on") a value or input Y depends on Y but can also depend on additional information or factors. Y can be directly or indirectly used when determining, assigning, generating, calculating, or creating X "based on" (or "based at least in part on") Y. Thus, for example, the language determining or assigning X "based on" Y can indicate determining or assigning X using Y.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and these terms should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. One or more computer-readable media storage or memory devices having stored thereon computer-executable instructions for causing a processor system, when programmed thereby, to perform operations comprising, with an operating system service of an operating system of a client computer system:

receiving, from an application executing on the client computer system, a request to register the application with the operating system service, the request being received across an interface exposed by the operating system service, wherein as part of the request the application specifies a parameter for video quality estimation;

registering the application with the operating system service;

sending, to the application, an indicator that registration has succeeded, the indicator being sent across the interface exposed by the operating system service; and for a portion of reconstructed video content:

receiving video data;

estimating, using the video data, video quality of the portion of reconstructed video content; and sending, to the application, results of the estimating the video quality.

2. The one or more computer-readable storage or memory devices of claim 1, wherein the estimating the video quality includes:

calculating multiple constituent quality metrics for the portion of reconstructed video content; and mapping, using a machine learning model, the multiple constituent quality metrics to a video quality score.

3. The one or more computer-readable storage or memory devices of claim 1, wherein the machine learning model is a convolutional neural network.

4. The one or more computer-readable storage or memory devices of claim 1, wherein the estimating the video quality includes, for each of multiple types of compression artifacts:

generating a type-specific metric, the type-specific metric indicating likelihood of that type of compression artifact in the portion of reconstructed video content.

5. The one or more computer-readable storage or memory devices of claim 4, wherein the multiple types of compression artifacts include one or more of blocking, ringing, banding, and blurring.

6. The one or more computer-readable storage or memory devices of claim 1, wherein the estimating the video quality includes, for each of multiple regions of the portion of reconstructed video content:

generating a region-specific metric, the region-specific metric indicating likelihood of compression artifacts in the region.

7. The one or more computer-readable storage or memory devices of claim 1, wherein the portion of reconstructed video content is a video frame.

8. A client computer system comprising a processor system and memory, wherein the client computer system is configured to perform operations comprising, with an application executing on the client computer system:

sending, to an operating system service of an operating system of the client computer system, a request to register the application with the operating system service, the request being sent across an interface exposed by the operating system service, wherein as part of the request the application specifies a parameter for video quality estimation;

receiving, from the operating system service, an indicator that registration has succeeded, the indicator being received across the interface exposed by the operating system service; and for a portion of reconstructed video content:

providing, to the operating system service, video data; and receiving, from the operating system service, results of estimating video quality of the portion of reconstructed video content, the results having been generated with the operating system service.

9. The client computer system of claim 8, wherein the operations further comprise, with the application:

generating feedback based at least in part on analysis of the results; and sending, to a cloud service, streaming service, or conferencing service, the feedback.

10. The client computer system of claim 9, wherein the analysis of the results includes one or more of filtering the results and aggregating the results.

11. The client computer system of claim 8, wherein the results include:

a video quality score for the portion of reconstructed video content; or for each of multiple regions of the portion of reconstructed video content, a region-specific video quality score for the region.

12. The client computer system of claim 8, wherein the operations further comprise, with the application:

receiving encoded data;

decoding the encoded data to produce the portion of reconstructed video content;

performing post-processing operations on the portion of reconstructed video content; and outputting the post-processed video content for display.

13. The client computer system of claim 12, wherein the operations further comprise, with the application:

selecting between a hardware mode and a software mode for the decoding.

14. In a server computer system, a method comprising, with a cloud service of the server computer system:

receiving packets of encoded data;

modifying the packets of the encoded data to simulate network effects by dropping, delaying, reordering, and/or corrupting one or more of the packets;

depacketizing and demultiplexing the modified packets;

decoding encoded data from the modified packets to produce a portion of reconstructed video content; and for the portion of reconstructed video content:

receiving video data;

estimating, using the video data, video quality of the portion of reconstructed video content;

generating encoder control values based at least in part on analysis of results of the estimating the video quality; and sending, to a streaming or conferencing service, the encoder control values.

15. The method of claim 14, further comprising, with the cloud service:

receiving, from the streaming or conferencing service, a request to register the streaming or conferencing service with the cloud service; and registering the streaming or conferencing service with the cloud service.

16. The method of claim 14, wherein the estimating the video quality includes:

calculating multiple constituent quality metrics for the portion of reconstructed video content; and mapping, using a machine learning model, the multiple constituent quality metrics to a video quality score.

17. The method of claim 14, wherein the estimating the video quality includes:

for each of multiple types of compression artifacts, generating a type-specific metric, the type-specific metric indicating likelihood of that type of compression artifact in the portion of reconstructed video content; or for each of multiple regions of the portion of reconstructed video content, generating a region-specific metric, the region-specific metric indicating likelihood of compression artifacts in the region.

18. The method of claim 14, further comprising, with the cloud service:

retrieving, from a database, one or more encoder settings, wherein the generating the encoder control values is also based at least in part on the one or more encoder settings; and/or retrieving, from a database, one or more heuristic rules, wherein the generating the encoder control values is also based at least in part on the one or more heuristic rules.

19. The method of claim 14, wherein the encoder control values include one or more of frame rate, spatial resolution, overall bit rate, intra frame distance, frame type, and quantization parameters.

20. The method of claim 15, wherein the request is received across an interface exposed by the cloud service, the method further comprising:

sending, to the streaming or conferencing service, an indicator that registration has succeeded, the indicator being sent across the interface exposed by the cloud service.

* * * * *